(12) United States Patent (10) Patent No.: US 8,667,285 B2
Coulier et al. (45) Date of Patent: Mar. 4, 2014

(54) REMOTE AUTHENTICATION AND TRANSACTION SIGNATURES

(75) Inventors: Frank Coulier, Grimbergen (BE); Frank Hoornaert, Bertem (BE); Frederik Mennes, Brecht (BE)

(73) Assignee: Vasco Data Security, Inc., Oakbrook Terrance, IL (US)

( * ) Notice: Subject to any disclaimer, the term of this patent is extended or adjusted under 35 U.S.C. 154(b) by 199 days.

(21) Appl. No.: 13/086,182

(22) Filed: Apr. 13, 2011

(65) Prior Publication Data

US 2011/0258452 A1 Oct. 20, 2011

Related U.S. Application Data

(63) Continuation-in-part of application No. 11/756,088, filed on May 31, 2007, now Pat. No. 7,930,554.

(51) Int. Cl.

| *H04L 9/32* | (2006.01) |
|---|---|
| *G06F 15/16* | (2006.01) |
| *H04L 29/06* | (2006.01) |
| *G06F 12/00* | (2006.01) |
| *H04L 9/00* | (2006.01) |

(52) U.S. Cl.
USPC ............. 713/171; 713/168; 726/9; 726/20; 380/259

(58) Field of Classification Search
USPC .......... 713/168–174, 182–186, 202; 709/225, 709/229; 726/2–8
See application file for complete search history.

(56) References Cited

U.S. PATENT DOCUMENTS

| 4,590,365 A | 5/1986 | Okada |
|---|---|---|
| 4,599,489 A | 7/1986 | Cargile |
| 4,609,777 A | 9/1986 | Cargile |
| 4,819,267 A | 4/1989 | Cargile et al. |
| 4,885,778 A | 12/1989 | Weiss |
| 5,412,726 A | 5/1995 | Nevoux et al. |

(Continued)

FOREIGN PATENT DOCUMENTS

| DE | 198 41 886 A1 | 8/1999 |
|---|---|---|
| EP | 1 211 841 B1 | 6/2002 |

(Continued)

OTHER PUBLICATIONS

Lim (EGC'05 Proceedings of the 2005 European conference on Advances in Grid Computing pp. 255-264 Springer-Verlag Berlin, Heidelberg © 2005 ).*

(Continued)

*Primary Examiner* — Evans Desrosiers
(74) *Attorney, Agent, or Firm* — RatnerPrestia

(57) ABSTRACT

The invention provides a method, apparatus, computer readable medium and signal which allows the usage of devices containing PKI private keys such as PKI-enabled smart cards or USB sticks to authenticate users and to sign transactions. The authenticity of the user and/or the message is verified. Furthermore the operation (authentication and/or signing) occurs without the need for an application to have some kind of a direct or indirect digital connection with the device containing the private key. In addition the operation occurs without the need for the PKI-enabled device containing the private key (e.g. a PKI smart card or USB stick) to either support symmetric cryptographic operations or to have been personalized with some secret or confidential data element that can be read by a suitable reader.

16 Claims, 19 Drawing Sheets

(56) References Cited

U.S. PATENT DOCUMENTS

| | | | |
|---|---|---|---|
| 5,485,519 A | 1/1996 | Weiss | |
| 5,521,966 A | 5/1996 | Friedes et al. | |
| 5,613,159 A | 3/1997 | Colnot | |
| 5,625,534 A | 4/1997 | Okaya et al. | |
| 5,657,388 A | 8/1997 | Weiss | |
| 5,802,176 A | 9/1998 | Audebert | |
| 5,884,292 A | 3/1999 | Baker et al. | |
| 5,889,941 A | 3/1999 | Tushie et al. | |
| 5,915,209 A | 6/1999 | Lawrence | |
| 5,937,068 A | 8/1999 | Audebert | |
| 5,943,423 A | 8/1999 | Muftic | |
| 5,988,510 A | 11/1999 | Tuttle et al. | |
| 6,065,679 A | 5/2000 | Levie et al. | |
| 6,129,274 A | 10/2000 | Suzuki | |
| 6,145,739 A | 11/2000 | Bertina et al. | |
| 6,196,459 B1 | 3/2001 | Goman et al. | |
| 6,234,389 B1 | 5/2001 | Valliani et al. | |
| 6,308,266 B1 | 10/2001 | Freeman | |
| 6,351,813 B1 | 2/2002 | Mooney et al. | |
| 6,393,563 B1 * | 5/2002 | Maruyama et al. | 713/155 |
| 6,484,260 B1 | 11/2002 | Scott et al. | |
| 6,550,683 B1 | 4/2003 | Augustine | |
| 6,564,995 B1 | 5/2003 | Montgomery | |
| 6,694,436 B1 | 2/2004 | Audebert | |
| 6,715,078 B1 | 3/2004 | Chasko et al. | |
| 7,519,989 B2 | 4/2009 | Lin et al. | |
| 7,546,373 B2 * | 6/2009 | Lehew et al. | 709/229 |
| 2001/0054148 A1 | 12/2001 | Hoornaert et al. | |
| 2002/0087860 A1 | 7/2002 | Kravitz | |
| 2002/0175207 A1 | 11/2002 | Kashef et al. | |
| 2003/0065653 A1 | 4/2003 | Overton et al. | |
| 2003/0212894 A1 | 11/2003 | Buck et al. | |
| 2005/0050330 A1 | 3/2005 | Agam et al. | |
| 2011/0060913 A1 | 3/2011 | Hird et al. | |

FOREIGN PATENT DOCUMENTS

| | | |
|---|---|---|
| WO | WO 98/16908 A1 | 4/1998 |
| WO | WO 01/61620 A1 | 8/2001 |
| WO | WO 2005/022288 A2 | 3/2005 |
| WO | WO 2009/025905 | 2/2009 |

OTHER PUBLICATIONS

International Search Report for PCT/US2012/033432 mailed Jul. 10, 2012.

Han et al., Authenticated Public-Key Encryption Based on Elliptic Curve; Embedded Software and Systems, 2005. Proceedings of the Second International Conference on Embedded Software and Systems; (ICESS 2005); IEEE.

Hallsteinsent et al., "Using Mobile Phone As a Security Token for Unified Authentication"; (ICSNC 2007);p. 68.

Suh et al., Efficient Memory Integrity Verification and Encryption for Secure Processors; Microarchitecture, Proceedings of the 36 International symposium on Microarchitecture (MICRO-36-'03). pp. 339-350.

Schneier, "Risks of PKI:Electronic Commerce" (2000).

Clear2Pay, "clear2pay's e-Security Pack (eSP) compliant with the Master Card OneSmart™ Chip Authentication Program", Brussels/Paris, 2 pgs. (Nov. 15, 2005.

"The Next Generation of eBanking", Retrieved: www.terideau.com, 1 pg. (Aug. 2006).

* cited by examiner

REMOTE AUTHENTICATION AND TRANSACTION SIGNATURES

RELATED APPLICATION

This application is a continuation-in-part of prior co-pending application Ser. No. 11/756,088, filed May 31, 2007, which is incorporated herein by this reference.

BACKGROUND OF THE INVENTION

As remote access of computer systems and applications grows in popularity the number and variety of transactions which are accessed remotely over public networks such as the Internet has increased dramatically. This popularity has underlined a need for security in particular;

a. How to insure that people who are remotely accessing an application are who they claim they are and how to insure the transactions being conducted remotely are initiated by legitimate individuals. This subject is referred to as authentication.

b. How to insure that transaction data has not been altered before being received at an application server. This is referred to as data integrity.

c. How to guarantee that an individual, once having engaged in a transaction, is not in a position to repudiate it. This is referred to as non-repudiation.

In the past, application providers have relied on static passwords to provide the security for remote applications. In the last couple of years it has become evident that static passwords are not sufficient and that more advanced security technology is required.

PKI Smart Cards

One way of solving the security problems associated with remote access to computer systems and applications over public networks is provided by a Public Key Infrastructure. In a Public Key Infrastructure one associates a public-private key pair with each user. The key pair is associated with a certificate (issued by a trusted Certificate Authority) that binds that public-private key pair to a specific user. By means of asymmetric cryptography this public-private key pair can be used to:

a. authenticate the user, b. sign transactions, documents, e-mails (so as to prevent repudiation), and c. set up encrypted communication channels.

To guarantee an adequate level of security it is mandatory that each user's private key remains secret and can only be accessed (e.g. to create a signature) by the legitimate user associated with that key. It is common to rely on a smart card to store the public-private key pair and the certificate and to carry out the cryptographic calculations involving the private key. The use of the private key by the card is then often PIN-protected.

PKI-enabled smart cards are, and have been issued by:

a. Corporations to their employees or customers to secure the log-in to their computer networks or the remote access to their applications, b. Banks to their customers to secure e.g. Internet banking applications, and c. Governments to their citizens as electronic ID cards to create legally binding electronic signatures.

Apart from the advantages, there are also some disadvantages associated with PKI and the smart cards carrying the PKI keys and certificates:

a. Building a Public Key Infrastructure is generally quite complicated and therefore expensive when compared to competing security technologies.

b. PKI is inherently limited to environments and applications where there is a digital connection between clients and servers. In other words it is unsuitable for telephone banking or other delivery channels where it is not possible to provide a digital connection between the container of the PKI certificate and private key on the one hand and an application server on the other hand.

c. PKI smart cards do not have a power supply or a user interface. PKI smart cards therefore rely on the presence of an interfacing device that provides electrical power to the card, that is capable of digitally exchanging data with the card, and that is capable of interfacing with the user (e.g. capturing the card's PIN and presenting the data that should be signed). In most cases a PC with a connected transparent smart card reader is used. This reduces the mobility of the user (many PCs are not equipped with smart card readers). It also presents a security problem: all user interaction (such as approving a signature or capturing the card's PIN) is done on the inherently insecure PC.

Strong Authentication Tokens

An alternative technology for authentication and transaction signature capabilities is offered by what are called 'strong authentication token devices'. A typical example of strong authentication token is any one of the Digipass tokens offered by Vasco Data Security Inc., see the website Vasco.com.

A strong authentication token is a small autonomous battery-powered device with its own display and keyboard. In some cases the keyboard is reduced to a single button or even completely omitted. The main purpose of a strong authentication token is to generate so-called 'One-Time Passwords' (OTPs). In some cases strong authentication tokens are also capable of generating electronic signatures or Message Authentication Codes (MACs) on data that has been entered on the token's keyboard. If the token has a keyboard, the usage of the token is often protected by a PIN.

To be able to generate OTPs or MACs, strong authentication tokens are capable of doing cryptographic calculations based on symmetric cryptographic algorithms parameterized with a secret value or key. Typical examples of such symmetric cryptographic algorithms parameterized with a secret value or key are symmetric encryption/decryption algorithms (such as 3DES or AES) and/or keyed one-way hash functions (such as MD5 or SHA-1 in OATH compliant tokens). In the remainder of the text the output of such algorithms will sometimes be referred to as 'symmetric cryptogram'. The terminology 'symmetric cryptogram' shall thus be understood as not only the output of a symmetric encryption algorithm but also of symmetric decryption algorithms or keyed hash functions. Strong authentication tokens are personalized with one or more secret keys that are supposed to be different for each individual token. To generate a one-time password or signature, the token typically performs the following steps (refer to FIG. 1):

a. Step 10: The token takes one or more input values (these could include a challenge generated by a server and typed-in on the keyboard by the user, and/or the value of the token's internal real-time clock, and/or the value of an internal counter managed by the token, and/or transaction data typed-in on the token's keyboard by the user).

b. Step 11: The token puts the one or more input values into a specified format.

c. Step 12: The token then cryptographically combines the one or more input values with a personalized secret key 15 stored securely in the token. In a typical strong authentication token the token submits the one or more input values to a symmetric encryption/decryption algorithm and/or one-way hash function parameterized by a personalized secret key 15 stored securely in the token. The result is a cryptogram or a hash value.

d. Step 13: The token transforms the cryptogram or hash value that is the outcome of this encryption/decryption or one-way hash (or more generally, some other cryptographic combination) into the actual OTP or MAC. i.e., the cryptogram or hash is typically truncated, converted in a human readable format (e.g. through decimalization) and visualized on the display. The user may submit this value to the application server.

In the remainder of the text one-time passwords or electronic signatures generated by strong authentication tokens as described above may be referred to as dynamic authentication credentials or just dynamic credentials. In the remainder of the text the input values referred to in step 10 may be referred to as dynamic variables. Dynamic variables the value of which comes from a source that is external to the strong authentication token may be referred to as external dynamic variables. Examples of external dynamic variables may include a challenge or transaction data that e.g. may be provided to the token by a user entering them on the token's keyboard. Dynamic variables the value of which comes from a source that is internal to the strong authentication token may be referred to as internal dynamic variables. Examples of internal dynamic variables may include a time-value that is provided by a token's real-time clock or a counter that is stored in a token's memory and updated by the token's processor. The algorithms published by the "OATH—initiative for open authentication" are an example of standardized algorithms for generating dynamic credentials.

In most cases a strong authentication token is a physical device, however in some cases the functionality of these strong authentication tokens to generate OTPs or MAC signatures is emulated by software running on a PC, a workstation, a mobile phone, a personal organizer, a PDA, etc. The latter are referred to as "soft tokens".

Once the OTP or MAC has been produced it is conveyed to an entity where the value can be verified as authenticating the user or the message, see FIG. 2. Typically the entity is an application server. The application server stores data for each token, including which secret key(s) the token has been personalized with, and the identity of the user associated with the token. To validate a one-time password or signature, the server retrieves the secret key (115) which is a copy of the key personalized in the token, takes the same inputs that were used by the token and in essence performs the same algorithm 112 as the token. The server then compares 120 the result it obtained with the value it received. (In practice, the validation of an OTP or MAC is often somewhat more convoluted if the strong authentication algorithm is time-based or counter-based, due to synchronization issues.) Since a one-time password or signature generated by a strong authentication token is a function of the token's individual secret key and the always different values of the input(s) to the token algorithm, validating the correctness of the one-time password or signature gives the application server a very high degree of confidence that the person submitting the one-time password or signature possesses the correct token and knows its PIN (if the token is PIN protected), which in turn gives a high degree of confidence that that person is indeed the legitimate user associated with that token device.

Because the OTP verification server and the OTP token in essence perform the same algorithm with the same key, the OTP generation algorithm can be a one-way or non-reversible function. That means that the actual OTP can be shorter than the cryptogram or hash value from which it is derived. This allows for OTP or MAC lengths that are sufficiently short so that it is not too inconvenient for users to manually copy the OTP or MAC values from the token display onto a PC. As a consequence strong authentication tokens don't require a digital connection between the token and the verification server.

The major advantages of strong authentication tokens when compared to PKI cards are:

a. They are fully autonomous (tokens have their own power supply and their own user interface);

b. They are independent of the delivery channel or communication medium (tokens don't require any digital or electronic connection with any other device; all input and output of data is done by the user via the token's display and keyboard); and c. They offer a very high level of security (all user interaction such as capturing the PIN or providing transaction data to be signed is done via the token's own secure user interface).

In some cases where smart cards have been issued, one wants to get around the disadvantages and limitations associated with smart cards and achieve the same advantages that strong authentication tokens offer i.e. full autonomy, independence of the delivery channel, and a secure user interface.

One alternative is to combine the smart card with an unconnected, battery-powered smart card reader that has its own display and keyboard. The idea is that the combination of the smart card and the unconnected smart card reader emulates a strong authentication token. The functionality normally provided by a strong authentication token is then split over the smart card and the unconnected reader. The unconnected reader takes care of all user interface, and all or a part of the other token functionality is delegated to the card.

Typically, all personalized secrets and security sensitive data are stored and managed by the card (e.g. the PIN is stored and verified by the card, the secret keys are stored on the card and all cryptographic operations involving those keys are done by the card, counters used as input for the token algorithm are stored and managed by the card). Part of the token functionality that is less sensitive (e.g. truncating and converting the generated hashes or cryptograms) often happens in the reader. An example of this combination is discussed below.

This principle is often used by banks that combine the bank cards they issue (for usage at Automatic Teller Machines or Point Of Sale terminals) with unconnected readers to secure their remote banking applications (such as internet banking or telephone banking). A good example of this is the Mastercard Chip Authentication Programme (CAP), which specifies how EMV smart cards can be used in combination with unconnected smart card readers to generate one-time passwords and electronic transaction data signatures.

This technology relies on the smart cards being capable of doing symmetric cryptographic operations and having been personalized with a secret key to be used for symmetric cryptographic operations. However, PKI-enabled smart cards are designed to store asymmetric keys and do asymmetric cryptographic operations. Many PKI-enabled smart cards don't support symmetric cryptographic operations or (if they do) have never been personalized with an individual symmetric secret key.

Traditional PKI Signatures

The usual way to create an electronic signature with a PKI smart card, is that the input data (usually, the input data consist of a hash of the actual transaction data one wants to sign) are encrypted by the card's private key.

The usual way to validate such a signature, is that the validating entity decrypts the received signature with the public key. If the decryption of the signature results in the same value as the input data that were supposed to have been encrypted by the private key, the signature is validated successfully. Note that thanks to this asymmetric characteristic the validating entity never needs to have access to the card's private key. This allows the private key to be kept secret from any party other than the signing party, even from any verifying party, thus providing for true non-repudiation.

This can only be done successfully if the signature itself is in its entirety available to the validating entity. The decryption of an incomplete signature would only result in meaningless data that can not be compared with the input data that were supposed to have been signed.

This condition can not be fulfilled in practice when small hand-held unconnected smart card readers are being used: given that a typical PKI signature size is in the order of 100 bytes, the display of these readers is far too small to display a full signature and it is in any case totally unrealistic to expect a user to manually transfer a 100-byte value from the reader's display to a PC without making a single mistake. The 100-byte typical PKI signature should be compared to a typical 6 to 8-digit or 3 to 4-byte OTP or MAC of a traditional strong authentication token. This is certainly a reason why asymmetric cryptography and private keys have not been used to generate OTPs and MACs by e.g. strong authentication tokens.

What is desired is a method and apparatus that:
a. allows the usage of a device storing PKI private keys (such as PKI-enabled smart cards or USB sticks) to authenticate users and to sign transactions,
b. without the need for any user application to have some kind of a direct or indirect digital connection with the device containing the private key, in particular a digital connection that would allow the user application to submit data to the card for signing by the card's private key and that would allow retrieval of the entire resulting signature from the card should not be necessary,
c. without the need for the PKI-enabled device containing the private key (e.g. a PKI smart card or USB stick) to:
1. either support symmetric cryptographic operations, or
2. to have been personalized with some secret or confidential data element that can be read by a suitable reader.

SUMMARY OF THE INVENTION

This application provides a description of a method and apparatus which meets the foregoing desire. In particular this application describes a number of embodiments which use the private key of a public-private key pair (a key which is meant to be used for asymmetric cryptography such as for example the RSA algorithm) to authenticate a user (via generation of a OTP) or to sign data (via generation of a MAC).

The embodiments described here differ from the traditional use of private keys to authenticate users and sign data (as described above) in that:
a) the same cryptographic key is used to generate and verify the OTPs and MACs; and b) the length in bits of the OTP and MAC values can safely be considerably less than the length in bits of the cryptograms generated by the private keys.

All embodiments have in common that:
a. They all calculate a dynamic value using one or more variable inputs by means of a cryptographic algorithm that uses a secret that is also known or accessible to a verifying server.
b. These variable inputs can be any of:
1. Time value, or
2. Counter value, or
3. Challenge value, or
4. Transaction Data, or
5. Any combination of the above.
c. The dynamic value is then transformed into an OTP or MAC.
d. At some point in the course of developing the OTP or MAC an asymmetric cryptographic operation with a private key (i.e. an encryption/decryption or a signature) is carried out.
e. The transformation of the dynamic value into an OPT or MAC is such that the length or size of the OTP or MAC is smaller than the size of the cryptogram that was generated by the asymmetric cryptographic operation with the private key.

The precise role of the asymmetric cryptographic operation with the private key in the overall process of generating the OTP or MAC can be different from one embodiment to another.

In some embodiments the asymmetric cryptographic operation with the private key is performed each time an OTP or MAC has to be generated. In other embodiments more than one OTP or MAC can be generated in connection with a single asymmetric cryptographic operation with the private key. In the latter case, criteria that can determine whether or not a new asymmetric cryptographic operation with the private key is required when a new OTP or MAC needs to be generated can include:
a. The time that has passed since the last asymmetric cryptographic operation.
b. The number of OTPs and/or MACs that have already been generated.
c. Whether or not a communication session between a device containing the private key and a device capturing the inputs and making available the OTPs has been uninterrupted (e.g. whether a PKI smart card has not been removed from a smart card reader).
d. The type of OTP or MAC. For example the generation of a MAC might always require a new asymmetric cryptographic operation but the generation of an OTP would not.

In a typical embodiment only one private key is used and only one asymmetric cryptographic operation is performed with that private key. However, some embodiments may perform a number of cryptographic operations with either a single private key or with a number of private keys. Examples:
a. If the OTP is a function of the encryption result of the variable inputs by a private key, then a variant could be that the OTP is a function of more than one cryptogram, or that the variable inputs are encrypted by more than one private key to generate the OTP.
b. If the generation of an OTP only takes place after the presence of a specific smart card is verified by checking the result of an encryption of a challenge by the card's private key, then a variant could be that more than one challenge is submitted to the card to be encrypted by the card's private key.

c. In many cases a PKI card contains a so-called utility private key and a signature private key. In that case the utility key might be used if an OTP is generated and the signature key might be used if a MAC is generated.

In a preferred embodiment both OTPs to authenticate a user and MACs to sign data can be generated. However alternative embodiments can be limited to only being capable of generating OTPs or only being capable of generating MAC signatures.

In a typical embodiment the asymmetric cryptographic algorithm used with the private key will be the RSA algorithm. However, other embodiments can use other asymmetric algorithms provided they are capable of either encryption or decryption or signing functionality by using the private key. Examples of such algorithms include: RSA, knapsack algorithms such as Merkle-Hellman or Chor-Rivest, Pohlig-Hellman, Diffie-Hellman, ElGamal, Schnorr, Rabin, Elliptic Curve cryptosystems, Finite Automaton public key cryptosytems, the Digital Signature Algorithm (DSA, DSS).

In a typical embodiment the component that contains the private key and the component that generates the OTP and MAC values are two different components, each being a part of two different devices. However, embodiments can easily be conceived in which these two components are parts of the same device or are even the same component.

In a typical embodiment the private key is stored on a smart card. In a preferred embodiment the cryptographic calculations involving the private key are performed by that smart card. In a typical embodiment the OTP and/or MAC values are generated by a device that is equipped with or connected to a component or device that can communicate with the smart card containing the private key.

In a preferred embodiment the card reading device is an unconnected smart card reader with its own power supply and running the appropriate software to communicate with a PKI smart card which has been inserted into the smart card reader to generate OTPs or MACs.

In another embodiment the card reading device is the combination of some computing device such as a PC, PDA, cell phone, etc., equipped with a smart card reader and running the appropriate software to generate OTPs or MACs.

In a typical embodiment the physical, electrical and protocol aspects of the communication between the smart card and the smart card reading device is the same or similar to those described in the ISO 7816 standard. Other embodiments could use another communication interface such as a contactless smart card interface as described in ISO 14443.

Alternative form factors are available for the private key containing device, as well as alternative form factors for the OTP or MAC generating device, and alternative means for the communication between the private key containing component or device on the one hand and the OTP and MAC generating component or device on the other hand. These alternatives are within the scope of the invention as described herein.

In one embodiment the OTPs or MACs values are visualized on a display of the card reading device. An OTP can e.g. consist of a series of symbols. In a typical embodiment these symbols are decimal digits. In other embodiments these symbols can for example include:
 a. hexadecimal digits, or
 b. base 64 digits, or
 c. characters from a writing system such as an alphabet, or
 d. pictograms.

In one embodiment the generated OTPs or MACs are communicated to the user by means of audible signals. For example the OTP can be a string of digits or characters or words that each have a characteristic associated tone or that are read by a text-to-speech converter.

In one embodiment the generated OTPs or MACs are directly communicated to an application by some electronic wired or wireless communication mechanism. This mechanism can include a USB connection or an infrared connection or a Near Field Communication connection or an RF connection or a Bluetooth connection.

Other output mechanisms for the OTPs or MACs can be provided. In some embodiments the private key-based function is PIN protected.

The following description describes the basic embodiments in more detail. In some embodiments the card's private key-based function is directly or indirectly used in the OTP or MAC generation. Either
 a. an asymmetric cryptographic operation involving the card's private key is an integral phase or part of the transformation of the variable inputs into an OTP or MAC (Using The Asymmetric Algorithm In A Symmetric Way), or
 b. the card's private key-based function is used more indirectly to provide a seed value that is used to derive a secret symmetric key that is used by the OTP or MAC generation algorithm. (Using an asymmetric cryptogram as a seed to derive a secret key).

In some of the embodiments the value of the OTPs and/or MACs is a function of the actual value of the card's private key. In yet other embodiments the card's private key-based function is used to unlock the OTP or MAC generation algorithm in the reader:
 a. Either the card is linked to an already personalized reader and recognized on the basis of stored challenge-response pair(s), or
 b. the card is authenticated by the reader through traditional PKI certificate based verification.

In the embodiments described in the immediately preceding paragraph the value of the generated OTPs and/or MACs is not a function of the actual value of the card's private key.

Thus in one aspect the invention provides a method to generate a security value comprising a One-Time Password (OTP) or a Message Authentication Code signature (MAC) comprising:
 obtaining an intermediate dynamic value created using one or more variable inputs and a cryptographic algorithm employing at least one secret;
 transforming said dynamic value into said security value, wherein an asymmetric cryptographic operation with a private key is carried out producing a cryptogram, in order to transform said dynamic value, and
 said transforming includes producing said security value of a size which is smaller than the size of a cryptogram that was generated by said asymmetric cryptographic operation.

In another aspect the invention provides a device generating a security value comprising a One-Time Password (OTP) or a Message Authentication Code signature (MAC) using the method described immediately above.

In another aspect the invention provides a method of validating a security value provided by a user in order to authenticate the user or data associated with the user, said security value comprising a One Time Password or a signature comprising a Message Authentication Code; said method comprising:
 creating a reference cryptogram using a reference cryptographic algorithm applied to one or more reference inputs using a server key related to a PKI private key of an authentic user, the reference cryptographic algorithm and the one or more reference inputs selected as identical to corresponding elements used in creating the security value by the authentic user;

thereafter either operating on said reference cryptogram alone by transforming said reference cryptogram into a reference security value including producing said reference security value of a size which is smaller than the size of the reference cryptogram and effecting a comparison of said reference security value and said security value, or operating on both said reference cryptogram and said security value to produce a modified reference cryptogram and a modified security value, said operation on said reference cryptogram identical, in part to an operation carried out to create said security value, and effecting a comparison of said modified reference cryptogram and said modified security value, and determining validity of said security value from results of said comparison.

In still another aspect the invention comprises a computer readable medium supporting a sequence of instructions which, when executed perform a method of generating a security value comprising a One-Time Password (OTP) or a Message Authentication Code signature (MAC), said method comprising:

obtaining an intermediate dynamic value created using one or more variable inputs and a cryptographic algorithm employing at least one secret;

transforming said dynamic value into said security value, wherein an asymmetric cryptographic operation with a private key is carried out producing a cryptogram, in order to transform said dynamic value, and said transforming includes producing said security value of a size which is smaller than the size of a cryptogram that was generated by said asymmetric cryptographic operation.

Finally in still another aspect the invention comprises an information bearing signal comprising a sequence of instructions which, when executed in a processor perform a method of generating a security value comprising a One-Time Password (OTP) or a Message Authentication Code signature (MAC), said method comprising:

obtaining an intermediate dynamic value created using one or more variable inputs and a cryptographic algorithm employing at least one secret;

transforming said dynamic value into said security value, wherein an asymmetric cryptographic operation with a private key is carried out producing a cryptogram, in order to transform said dynamic value, and said transforming includes producing said security value of a size which is smaller than the size of a cryptogram that was generated by said asymmetric cryptographic operation.

BRIEF DESCRIPTION OF THE DRAWINGS

Several embodiments of the invention are now further described in the following portions of the specification when taken in conjunction with the attached drawings in which.

DETAILED DESCRIPTION

Figure 12:
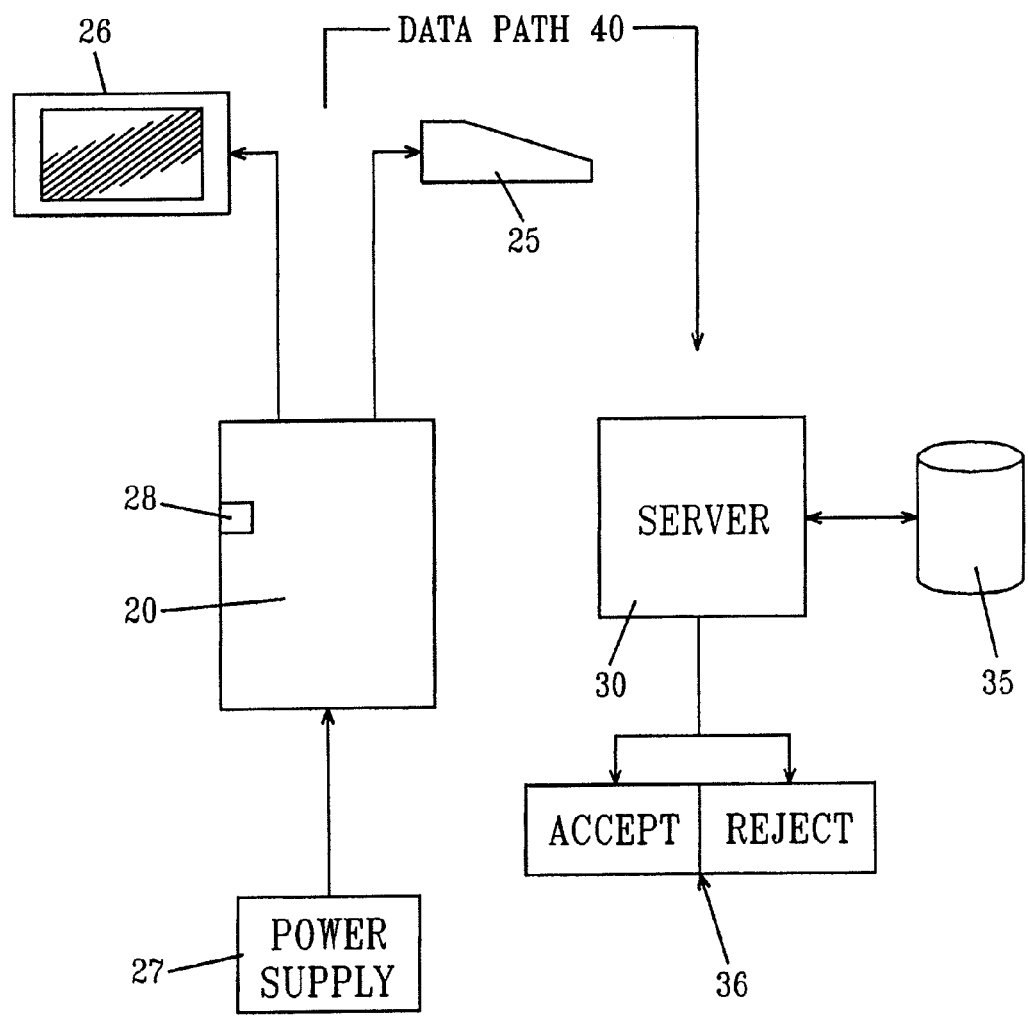
FIG. 12 illustrates the context in which embodiments of the invention operate.

Important components of embodiments of the invention are illustrated in FIG. 12 as including a smart card reader 20 (or simply reader) and an authentication server 30 (or simply server).

At a minimum the reader 20 includes an interface 28 to accept a smart card and a power supply 27. Some readers also include one or more user operable buttons or keys; this is represented in FIG. 12 by the keyboard 25. As used herein a user inserts a smart card into the smart card interface 28. As a consequence of some operation carried out by the reader 20, information is generated by the reader. That information may be a One-Time Password (OTP). If transaction data is input to the reader the information which is generated may include a signature such as a MAC. The output information may be presented on a display, such as the display 26. Alternatively the reader may be digitally connected to a network. In that event the information may be presented to another entity also connected to the network and the display 26 may be unnecessary. Typically the information which is generated by the reader 20 is used to authenticate a person or a message. A person may be authenticated by use of a smart card (proving possession of the card) and some other information (such as a PIN or other user data). The reader accepts the smart card and other information and creates an OTP. The OTP is communicated to server 30. Alternatively the message is signed by the reader 20, producing a MAC and the MAC is communicated to server 30.

Server 30 is typically implemented as a computer with processing capability and a data base 35. The information generated by the reader is communicated to the server 30 via the data path 40. Data path 40 may take various forms. Typically the user manually transfers information from the display 26 to a client device that is connected to the server 30. Alternatively data path 40 may comprise a digital path allowing information to be communicated from reader 20 to server 30. As another alternative the data path may carry audio information, such as a telephone circuit which carries the voice of a user enunciating information presented to the user on the display 26; where the information may be an OTP or MAC. Data path 40 may carry optical signals representing the information generated at reader 20. In general data path 40 is any path which can be used to communicate information from the reader 20 to the server 30. The server 30 accepts either the OTP or MAC and with the assistance of data in the data base 35 determines whether to accept or reject the information as validating the identity of the user (OTP) or the authenticity of the message (MAC). The particular procedures and data which are used by the server 30 are more particularly described below. One output of the server 30 selects either the accept or reject for status 36, reflecting either acceptance of the OTP as validating the authenticity of the user's claim of identity or the validation of the MAC as authenticating the associated message.

Using the Asymmetric Algorithm in a Symmetric Way

In this embodiment (see FIG. 3) a smart card 100 cooperates with a smart card reader 105. Smart card 100 stores a PKI private key 301 which is used in an asymmetric cryptographic operation. The card's private key-based function (i.e. an asymmetric cryptographic operation involving the card's private key such as signing or decrypting) is an integral phase or part of the process which produces the OTP or MAC.

Generation of the OTPs and/or MACs happens in the following way:

Step 99: Input values which will be used in later steps are captured.

Step 101: the input(s) for the OTP or MAC generation algorithm are transformed or formatted into an initial value.

Step 102: the initial value is signed or encrypted/decrypted by the card's private key 301.

Step 103: the resulting cryptogram is transformed into an OTP or MAC.

Figure 1:
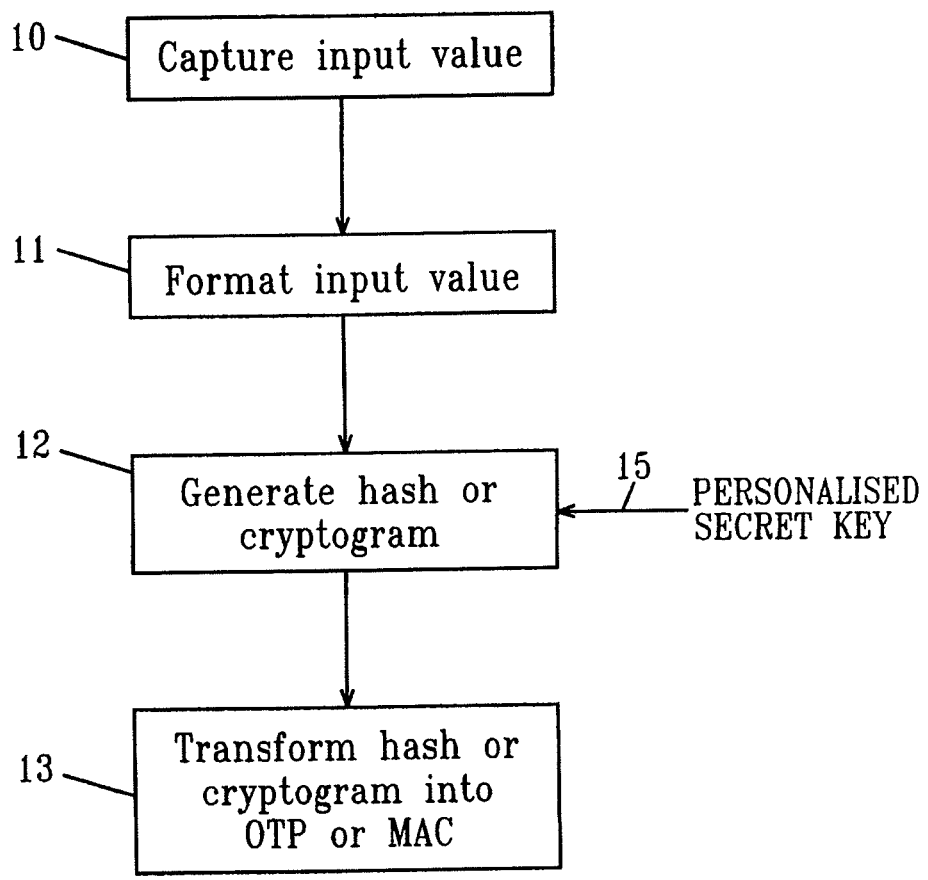
FIG. 1 is a flow diagram of the operation of a prior art strong authentication token in generating an OTP of MAC.
Figure 2:
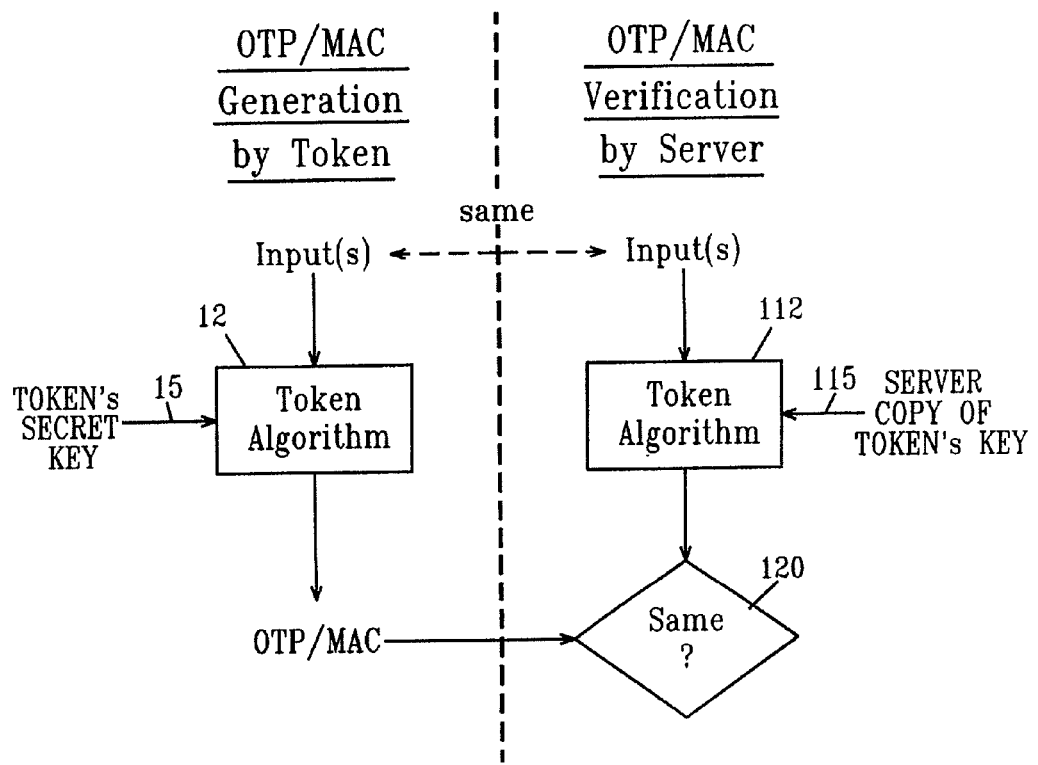
FIG. 2 is a flow diagram of the operation of a prior art server in authenticating an OTP or MAC generated by a strong authentication token and its relation to the OTP or MAC generation.
Figure 3:
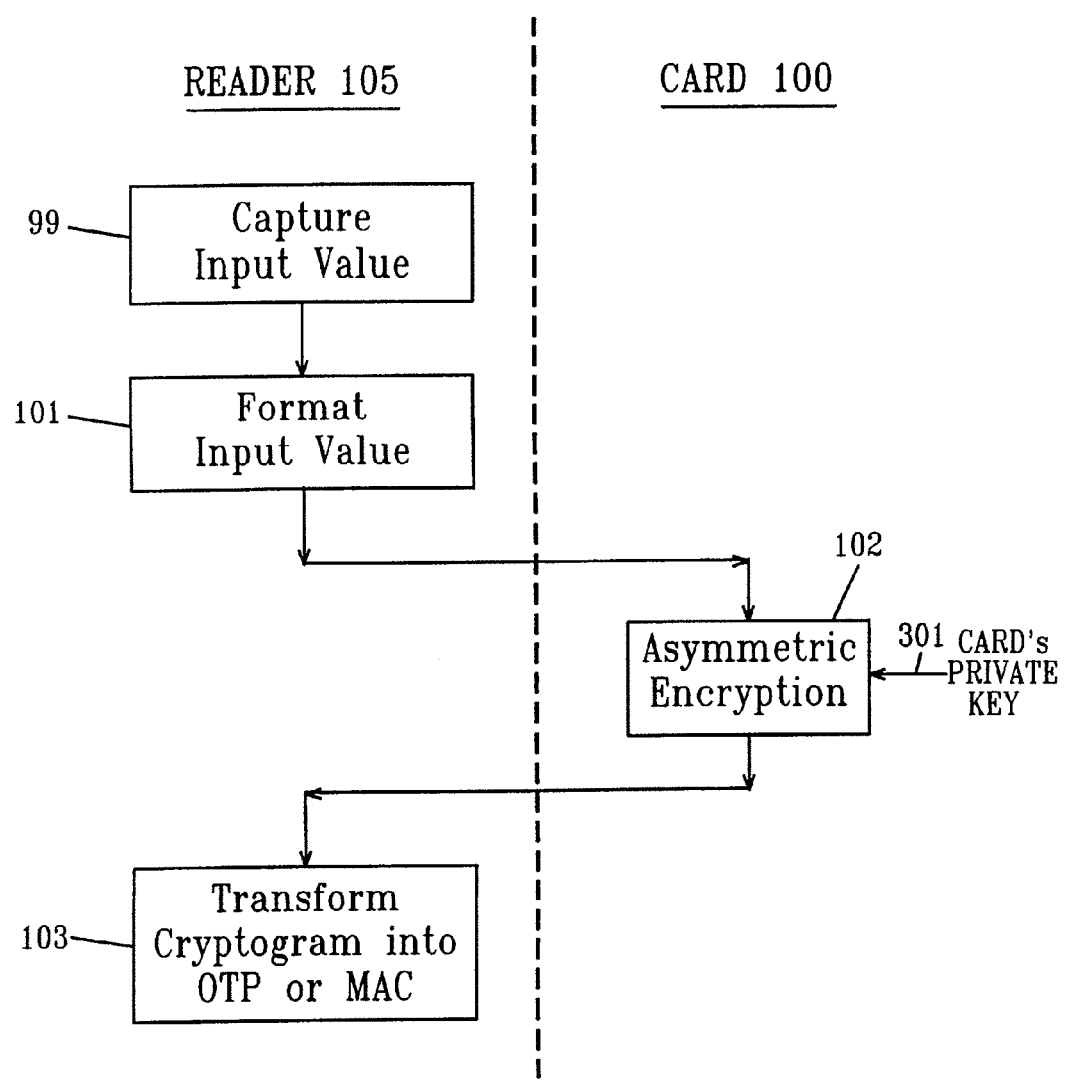
FIG. 3 is a flow diagram of an embodiment of the invention relying on an asymmetric cryptographic operation using a PKI private key to create a cryptogram from which an OTP or MAC is generated.

In the example of FIG. 3 the OTP or MAC is a function only of the result of the asymmetric cryptographic operation. However, in other embodiments the OTP or MAC may also be function of other data elements including values that are functions of the variable inputs but that are not functions of the private key 301.

In a typical embodiment the input(s) to the OTP or MAC generation algorithm are the same or similar as the inputs for the strong authentication algorithm(s) used in traditional strong authentication tokens. In other words these inputs may be selected as a:
 time value, or
 challenge (typically provided by a server), or
 counter value, or
 transaction data, or
 any combination of the above.

In some embodiments additional input(s) or parameter(s) to the OTP/MAC generation algorithm can include:
 data identifying a device (e.g. a reader serial number). or secrets stored in the device, or
 user identification data, or
secret codes or secret values provided by the user.

Formatting these input(s) into the initial value, step 101 can include operations such as:
 Concatenation, or
 Hashing. or
 encryption/decryption with a symmetric cryptographic algorithm (e.g. using a secret key stored in the device or provided by the user).

Transforming the resulting cryptogram into the final OTP or MAC value, step 103 can include the following operations:
 hashing (possibly a keyed hashing using a secret key stored in the reader 105 or provided by the user), or
 encryption/decryption with a symmetric cryptographic algorithm (e.g. using a secret key stored in the reader 105 or provided by the user), or
 truncation, or
 selection of certain bits, nibbles or bytes, or
 decimalization.

The latter may be accomplished by:
 interpreting the string of bits to be decimalized as a large binary representation of a number, or
 dividing the string of bits to be decimalized in groups of bits and mapping each group of bits onto a decimal digit. A typical example is dividing the string of bits into nibbles and mapping each nibble onto a decimal digit according to the following rule. If the hexadecimal value of the nibble is 0x0 to 0x9, take the decimal digit with the same value; if the hexadecimal value of the nibble is 0xA to 0xF, subtract a constant (between 0x6 and 0xA) and then take the decimal digit with the same value as the result of the subtraction, or
 many other decimalization algorithms known to those skilled in the art.

Figure 4:
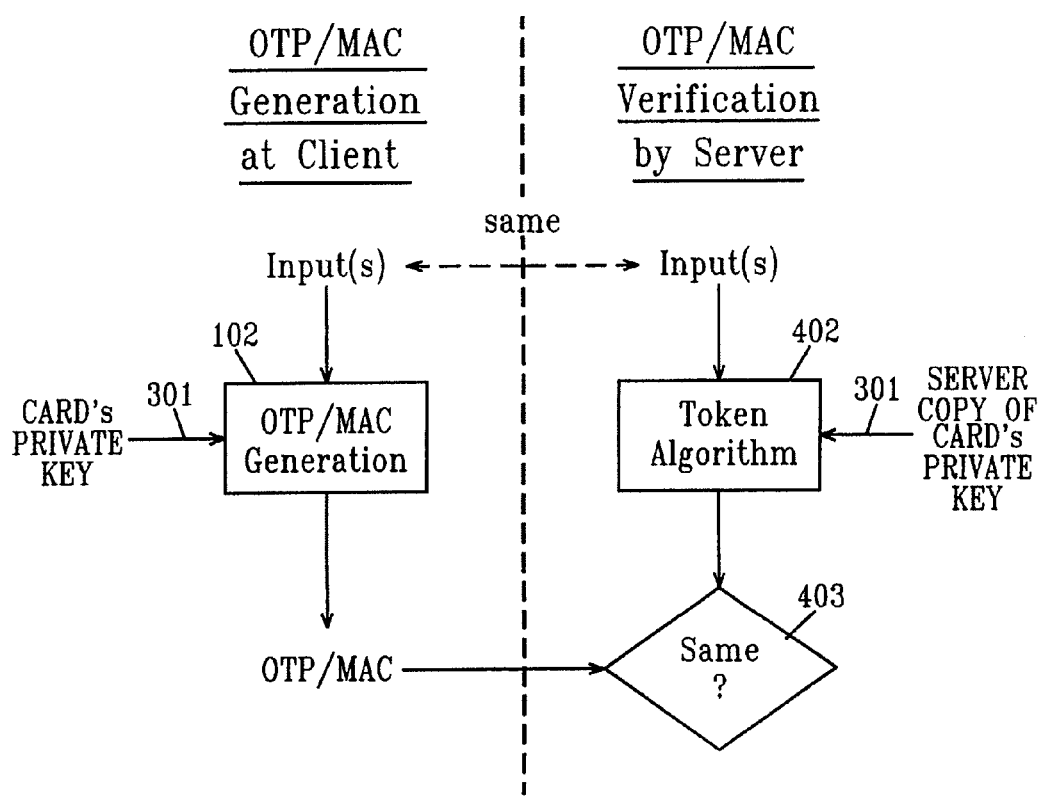
FIG. 4 is a flow diagram of an embodiment of the invention showing OTP/MAC generation at the client (as in FIG. 3, for example) and the related authentication at a server.

The validation phase is now described. In this embodiment the validating server has a copy of the private key 301 that was used to generate the OTP or MAC value and uses it to perform essentially the same algorithm as the algorithm to generate the OTP or MAC value. The validating server:
(refer to FIG. 4) somehow obtains or reconstructs or guesses the value(s) of the data elements that were used as input(s) to the OTP or MAC generation algorithm when the OTP or MAC was generated:
 in case of a time value, the validating server may have its own clock that is synchronized with the clock used for generating the OTP or MAC,
 in case of a challenge, the challenge may have been generated by the validating server itself or may have been passed to the validating server by the application together with the received OTP or MAC,
 in case of a counter, the validating server may maintain its own counter value synchronized with the counter value used for generating the OTP or MAC,
 in case of transaction data, these data may have been passed to the validating server by the application together with the received OTP or MAC;
 the input(s) for the OTP or MAC generation algorithm are transformed into an initial value.

The initial value is thereafter signed or encrypted/decrypted (402) using the copy of the private key 301 held by the validation server. The validating server then compares (403) the resulting reference cryptogram with the OTP or MAC value that was received. If the resulting reference cryptogram matches the OTP or MAC value that was received, the signature is validated successfully. This comparison might be done in a number of ways:

the validation server might in some embodiments transform the reference cryptogram into a reference OTP or MAC value and compare the reference OTP or MAC value with the received OTP or MAC value (e.g. by checking whether they are identical), or the validation server might reconstruct, from the received OTP or MAC value a part of the original cryptogram generated by the private key, and compare this partial cryptogram with the corresponding part(s) of the reference cryptogram, or the validation server might transform the reference cryptogram into a first intermediate validation value, and transform the received OTP or MAC into a second intermediate validation value, and compare the first and second intermediate validation values.

Figure 14:
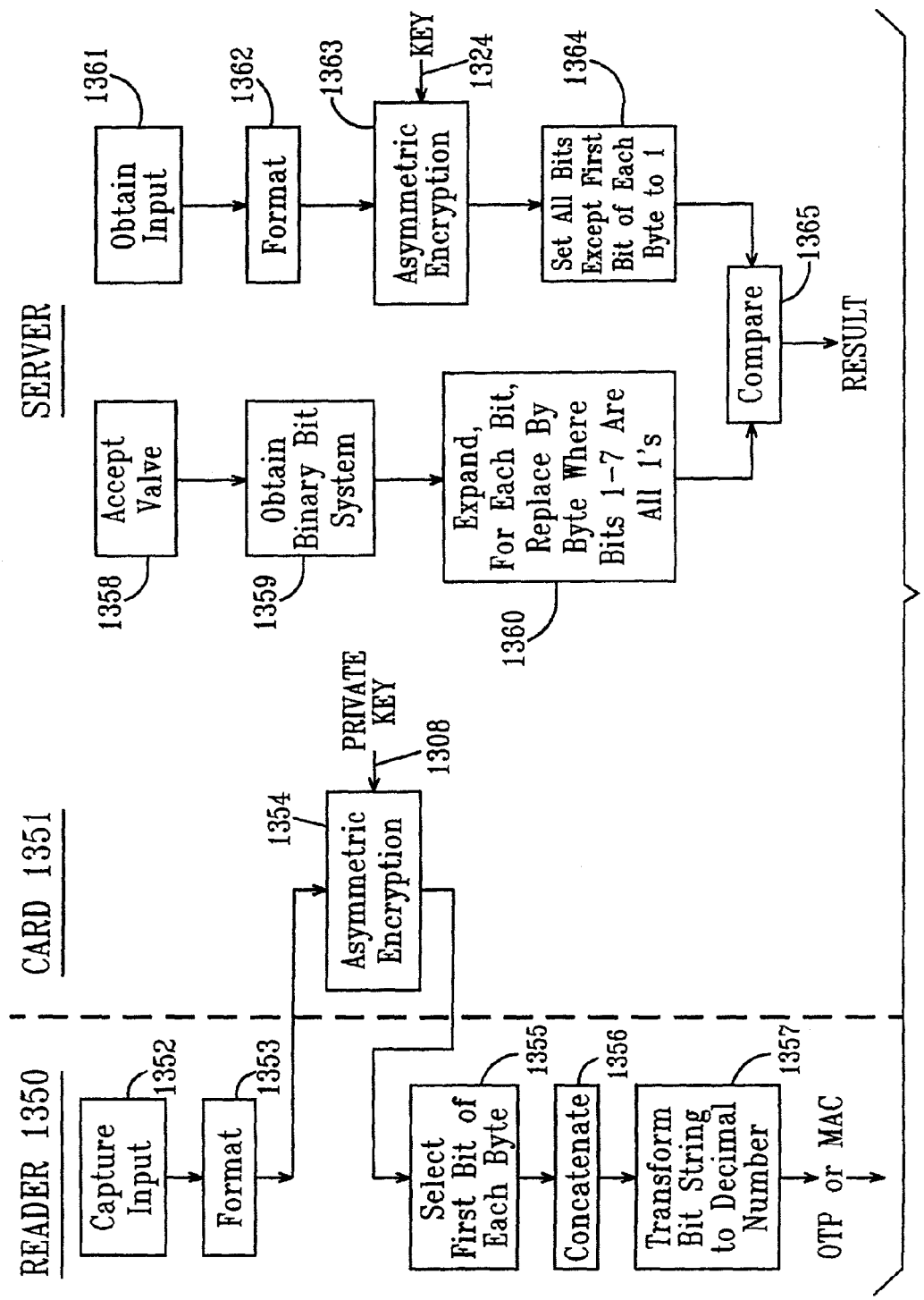
FIG. 14 is an illustration of another validation procedure.

This can be illustrated by the following example (see FIG. 14). In this example the OTP or MAC is produced based on a cryptogram which is the result of an asymmetric encryption using a private key 1308. The server produces a reference cryptogram which is also the result of an asymmetric encryption using a key 1324 which is a copy of the private key 1308. As shown in FIG. 14 the reader 1350 calculates the OTP or MAC from said original cryptogram by:
  selecting every first bit of every byte of said resulting cryptogram (1355), and
  concatenating said selected bits into a bit string (1356), and
  interpreting said bit string as the binary interpretation of a number and obtaining the OTP or MAC by taking the decimal representation of said number (1357)
the validation server validates this OTP or MAC as follows:
the server modifies the reference cryptogram by setting all bits except every first bit of every byte to 1 (1364), and
the server interprets the received OTP or MAC as the decimal representation of a number and obtains a bit string by taking the binary representation of that number (1359), and
the server expands said bit string by replacing every bit of said bit string by a byte that consists of the bit being expanded appended with seven 1-bits (1360), and,
the server compares said expanded bit string with said modified reference cryptogram (1365).

The parameters of this procedure (choosing one bit of every byte) is illustrative. Those skilled in the art will be able to select an appropriate parameter to suit their needs and context. In particular, a typical RSA cryptogram is about 100 bytes. Selecting one bit of each byte will produce 100 bits. At about 3 bits per decimal digit this will produce about 30 decimal digits for the OTP or MAC which is more practical than 300 decimal digits, but may still be considered awkward. In that event we can select one bit of every 40 bits for a total of 20 bits or about 6 decimal digits. The same procedure for generating the OTP or MAC from a cryptogram (transforming by selecting some but not all bits of the cryptogram) can also be used in the event a symmetric key is used in lieu of the asymmetric key. A typical symmetric cryptogram includes about 100 bits. In this case selecting one of every eight bits will leave us with about 12 bits or 4 decimal digits. This may be considered too small a number to be safe from attack. To avoid this problem we merely use one of every 4 bits (instead of 1 of every 8) to leave us with about 25 bits or about 8 decimal digits.

Figure 13:
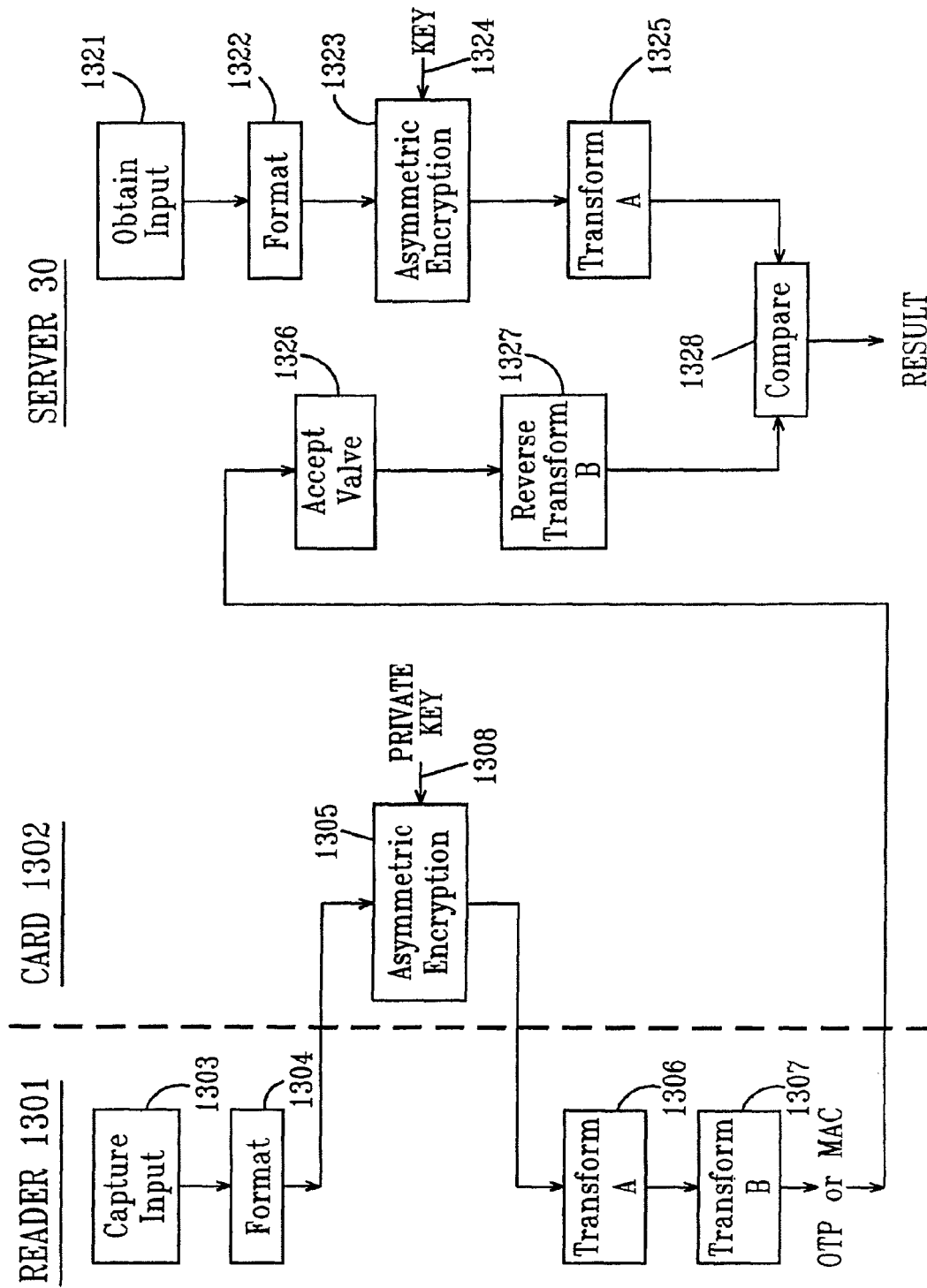
FIG. 13 is an illustration of a first validation procedure.

An alternative validation procedure is illustrated in FIG. 13. The procedures of FIG. 13 are the same as the procedures of FIG. 14 in producing the cryptogram on the client side (operation 1305) and the reference cryptogram on the server side (operation 1323). As shown in FIG. 13:

the cryptogram is transformed into the OTP or MAC by a sequence of two transformations, first a transform A (1306) and then a transform B (1307)

the validation server subjects the reference cryptogram to an operation 1325 to produce a modified reference cryptogram, operation 1325 is identical to the operation of transform A, the validation server also subjects the OTP or MAC to an operation (1327) which is the inverse of transform B to produce a modified OTP or MAC, validation depends on a comparison (1328) of the modified OTP or MAC with the modified reference cryptogram.

As was the case for the validation procedure of FIG. 14, the technique of FIG. 13 can be used regardless of whether the cryptogram is produced with a symmetric or asymmetric key.

In contrast to traditional PKI signature verification, the method of FIG. 3 doesn't require the full signature to be available to the server (as was demonstrated in connection with either FIG. 13 or 14). The solution can offer a very high level of security, even if no additional secret codes or keys (provided by the user or stored in the device) are being used other than the private key.

However, the technique of FIG. 3 can only be used if the validating server has a copy of the card's private key when it has to validate an OTP or MAC. The whole point of PKI is exactly that, in order to guarantee true non-repudiation, the private key is never accessible to anyone other than the user associated with that key. In many cases this is guaranteed by the card generating the private and public key pair on-board without any possibility of extracting the private key from the card. In other cases the key pair is generated externally and then injected into the card, but then procedures would normally ensure that the private key in the card personalization system is immediately destroyed after injection into the card and no copy of the private key is allowed to exist outside the card. In other words, this method will in many cases not be a suitable solution.

Figure 5:
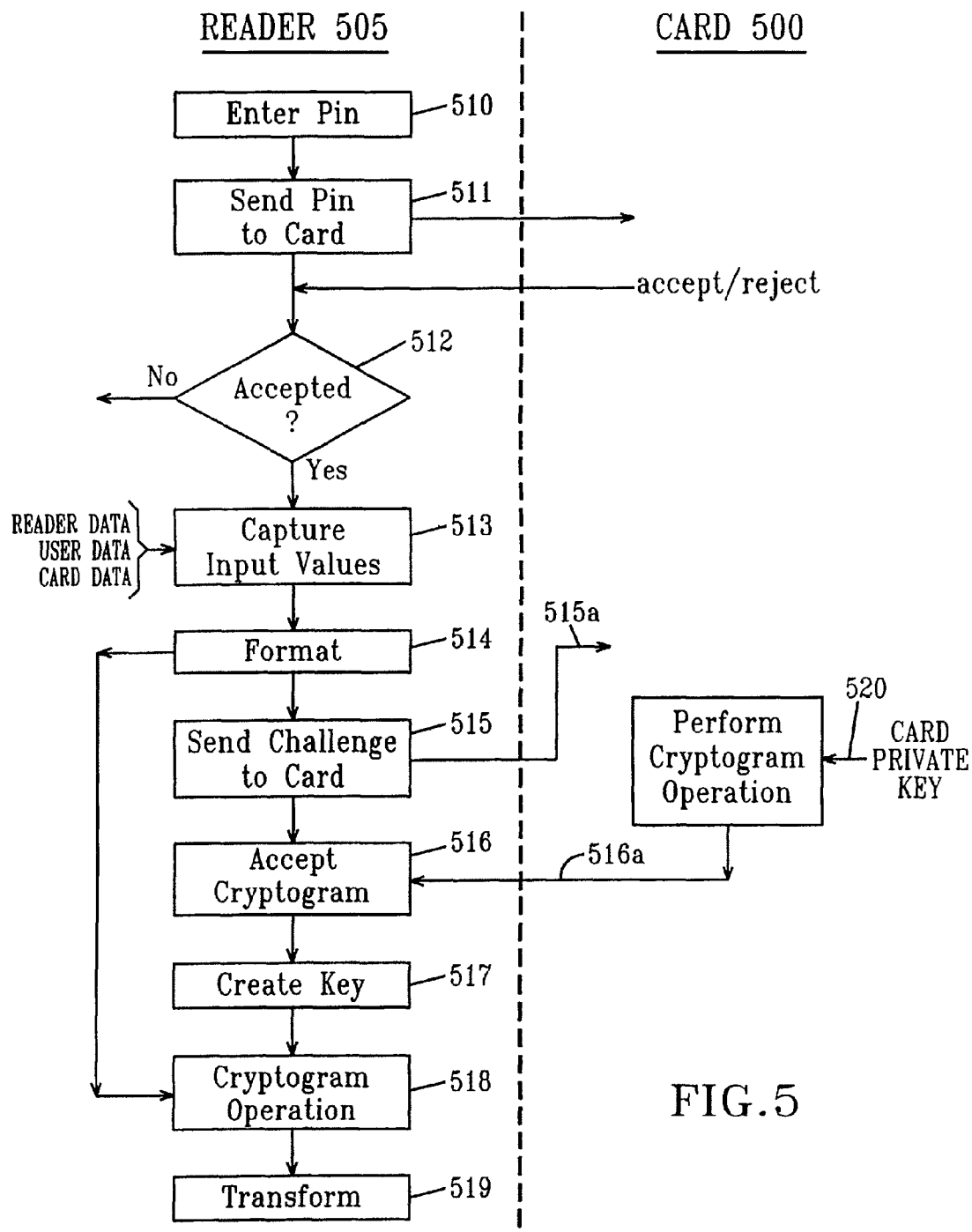
FIG. 5 is the flow diagram of another embodiment of the invention which uses an asymmetric cryptogram as a seed to derive a key which is used in creating a cryptogram representing an OTP or MAC.

Using an Asymmetric Cryptogram as a Seed to Derive a Secret Key (FIG. 5)

In the following embodiment, the requirement that the validation server has access to a copy of the private key at the time of validation is eliminated. In this embodiment an OTP/MAC is generated in the same way as a traditional strong authentication token. All the steps of this algorithm (capturing the inputs, formatting the inputs, encrypting or hashing the formatted inputs, transforming the resulting cryptogram or hash into an OTP/MAC) are performed by the reader 505. In this embodiment the invention differs from conventional practice in how the reader 505 obtains the symmetric secret strong authentication key. To obtain this secret symmetric authentication key, the reader 505 relies on an operation of the card 500 involving the card's private key 510.

The main steps of a basic embodiment of this method are as follows:

1. If required (i.e. the card protects usage of the private key by a PIN) the reader asks the user to enter the PIN and submits that PIN to the card.
2. Assuming the card 500 accepts the PIN, the unconnected card reader submits a fixed value to the card to be signed by the private key. This fixed value is further referred to as the 'reader-to-card challenge'.

3. The card signs the given challenge with its private key and returns the resulting cryptogram to the reader. This resulting cryptogram is further referred to as the 'card-to-reader signature response'.
4. The reader uses the resulting cryptogram as a seed to derive a symmetric secret key. This key is further referred to as the 'derived strong authentication secret key'.

The reader dynamically personalizes the strong authentication algorithm (that is entirely carried out by the reader) with that derived strong authentication secret key. In other words the reader carries out the strong authentication token algorithm using the derived strong authentication secret key.

FIG. 5 illustrates a suitable embodiment showing the interaction of reader 505 and card 500. The process may require the user to enter a PIN 510 in order to unlock the card 500. This step is optional, but if performed, the PIN entered at 510 by the user is communicated 511 to the card 500 to be tested. The card either accepts or rejects the PIN. The response of the card 500 is tested, 512 and only if accepted does the process continue. Thereafter function 513 captures input values from some or all of the reader, the user or the card. Function 514 may format some or all of the input values. Some or all of these values, or others, may form a reader-to-card challenge 515a which is sent (function 515) to the card 500. The card 500 uses the challenge 515a by performing a cryptographic operation with the card's private key 510. The resulting cryptogram, the card to reader signature response 516a, is communicated back to the reader, function 516. The response 516a is then used as a seed to create a secret value or key 517a via function 517. Key 517a is termed a derived secret strong authentication key. The key 517a is then used in a cryptographic operation, at function 518 along with the formatted value provided by function 514. Finally the resulting cryptogram is transformed at function 519 to produce the OTP or MAC.

The 'reader-to-card challenge' 515a could be any of the following:
1. A fixed value that is the same for all readers of a certain batch.
2. A fixed value that is fixed for a given reader but that has a different value for each reader.
3. A fixed value that is constant for a given user but that can be different for different users and that is entered at least once in the reader by the user. In practice it is very likely that this value will be entered either every time the card is used, or only the first time that a given card is used with a certain reader and will then be remembered by the reader.
4. Static data stored on the card that can be read by the reader (e.g. the public key and certificate, or a card serial number).
5. A combination of any of the above.
6. A value derived from any of the above. The derivation optionally including the use of some reader secret.

The algorithm to derive the strong authentication secret key from the 'card-to-reader signature response' could make use of the following techniques (among others):
1. Extracting bits of some data elements
2. Concatenating some parts of some data elements
3. Symmetric encryption/decryption algorithms (e.g. DES, AES, . . . )
4. Hashing algorithms (e.g. SHA-1)

The algorithm to derive the strong authentication secret key 517a from the 'card-to-reader signature response' 516a could make use of the following extra data elements besides the 'card-to-reader signature response' 516a:

1. A fixed value that is the same for all readers of a certain batch.
2. A fixed value that is fixed for a given reader but that has a different value for each reader.
3. A fixed value that is constant for a given user but that can be different for different users and that is entered at least once in the reader by the user.
4. Static data stored on the card that can be read by the reader (e.g. data associated with the private key such as the public key and certificate, or a card serial number).
5. A combination of any of the above.

This description only mentions the use of a single private key of a smart card and a single operation with that key; if the card contains more than one private key the reader could submit the 'reader-to-card challenge' 515a to each of these card private keys and combine the resulting 'card-to-reader signature responses' 516a in the derivation of the 'derived strong authentication secret key' 517a.

Similarly the reader could also submit different 'reader-to-card challenge' values 515a to the card and combine the resulting 'card-to-reader signature responses' 516a in the derivation of the 'derived strong authentication secret key' 517a.

In yet another embodiment the reader does not rely on a single 'reader-to-card challenge' 515a and corresponding 'card-to-reader signature response' 516a and 'derived strong authentication secret key' 517a, but instead uses a set of 'reader-to-card challenges' 515a and corresponding 'card-to-reader signature responses' 516a and 'derived strong authentication secret keys' 517a. To obtain a 'derived strong authentication secret key' 577a the reader selects one of these 'reader-to-card 515a challenges' and submits it to the card. Which 'reader-to-card challenge' 515a is selected determines the corresponding 'card-to-reader signature response' 516a and 'derived strong authentication secret key' 517a. This selection therefore must happen in a way that is predictable to the validation server. The reader can e.g. cycle through the set of 'reader-to-card challenges' 515a in a fixed order or can select a 'reader-to-card challenges' 515a depending on the value of the input(s) to the strong authentication token algorithm. A simple example of the latter method is that the strong authentication token algorithm works in challenge-response mode and that one specific digit (e.g. the last digit) of the challenge indicates the index of the 'reader-to-card challenge' to be used.

Because the private key is different for each card, the derived secret key will for a given challenge be specific to a given card. In other words, the secret key that is used in the strong authentication algorithm in the reader is function of the card (or more precisely: of the private key 510 in that card). That means that in principle one needs to have access to the correct card to be able to generate a correct OTP.

In most cases the private key is PIN protected, so that in addition to having access to the correct card, one also needs to know the card's PIN to be able to generate a correct OTP.

If the fixed value which the reader submits to the card to be signed by the private key can be different for different readers, then one needs besides the other elements (e.g. access to the correct card and knowledge of the card's PIN) also the correct reader. Note: such usage of a value that is different for different readers, effectively 'binds' the reader to the card.

For the validation server to be able to validate the strong authentication OTPs and/or MACs generated in this way, it must know the value of the derived strong authentication secret key 517a. The server must therefore know the card's signature response 516a. The card signature response for a given card challenge is determined by the card's private key

510 and can not be calculated without access to the private key 510. One consequence of this is that the server must have access to the card's private key 510 (directly or indirectly) at least once.

If the key pair is generated internally on the card this means that the server needs access to the card at least once, so that the server can submit to the card the card challenge(s) that will be applicable for this user and retrieve and store the card response(s) to that challenge(s) (indirect access to the private key). If the key pair is generated externally and then injected in the card, the server could use the private key directly to encrypt the challenge(s) before the private key outside the card is destroyed.

Only then is the server able to calculate the corresponding derived strong authentication key from the encrypted card challenge. The disadvantage of this is that, in practice, either the user will have to grant the server access to his/her card during a sort of registration phase, or (in case of external key generation) the server must be allowed to encrypt the challenge with the private key value before that private key value is destroyed.

Another consequence is that in practice for a certain user, the derived strong authentication secret key must remain unchanged. Since the derived strong authentication secret key is derived from the card's signature response to a certain card challenge, that card challenge and the corresponding 'card-to-reader signature response' must remain fixed for a given user. The disadvantage of this is that, if an attacker obtains the value of the 'card-to-reader signature response' of a certain user, then that attacker could potentially make fake cards that always return that recorded 'card-to-reader signature response' value when inserted in a reader.

Including reader specific or user specific data elements in the generation of the 'reader-to-card challenge' and/or the derivation of the 'derived strong authentication secret key' from the 'card-to-reader signature response' can make it harder for an attacker to obtain the value of the correct 'card-to-reader signature response' or to exploit that value with a reader to generate in a fraudulent way correct OTPs or MACs.

Another way to make it harder for an attacker to obtain the correct 'card-to-reader signature response' is to not rely on a single 'reader-to-card challenge' and corresponding 'card-to-reader signature response' and 'derived strong authentication secret key', but instead use a set of 'reader-to-card challenges' and corresponding 'card-to-reader signature responses' and 'derived strong authentication secret keys' as explained above.

In the following embodiment, the requirement for the server to have access at least once to the card to perform a private key operation is eliminated altogether.

In this embodiment, the value of the symmetric secret authentication key is not dependent (directly or indirectly) on the value of the card's private key. The symmetric secret authentication key is not derived from a seed that is generated by the card by means of an asymmetric cryptographic operation involving the card's private key. Instead the reader is personalized with the symmetric secret authentication key or with secret data from which the reader can dynamically derive the symmetric secret authentication key. With this symmetric secret authentication key the reader can generate OTPs or MACs just like a traditional strong authentication token. Usage of the reader is protected and reserved to the legitimate user by logically binding the user's card to the reader. Once the user's card has been bound to the reader, the reader will only generate an OTP or MAC if the user inserts the card that was bound to the reader. The card thus functions as an access key to unlock the personalized reader.

Figure 6:
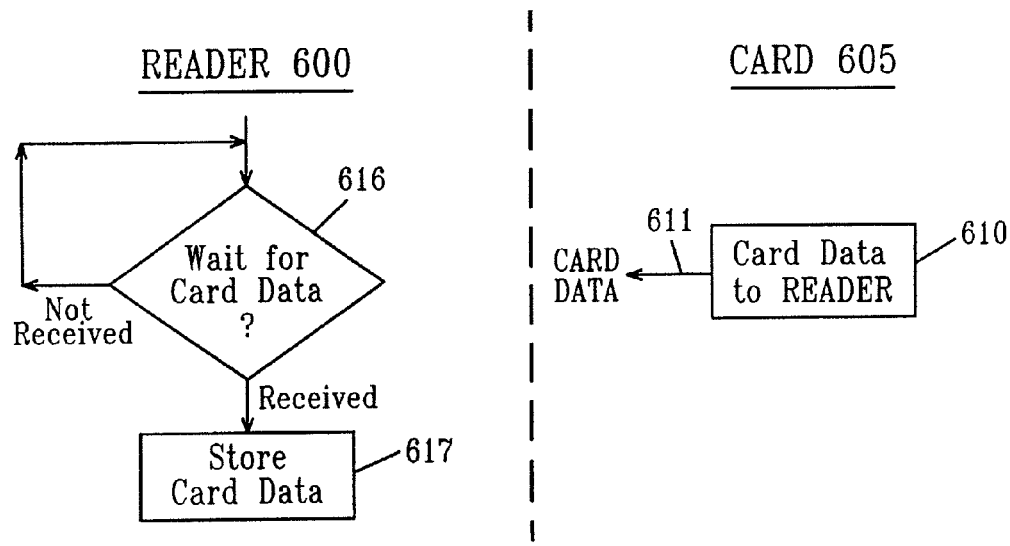
FIGS. 6 and 7 are flow diagrams of still another embodiment of the invention in which the smart card is used to authenticate the user to the reader, which in turn produces a cryptogram from which an OTP or MAC is derived, in this embodiment the user's smart card is bound to the reader in an initial operation (FIG. 6) and operation thereafter is represented in FIG. 7.

At first usage, the reader will request the user's card to be inserted. Upon insertion of the card, the reader binds itself logically to the inserted card in the following way. The reader determines and remembers some specific individual characteristics of that card. These characteristics can include:
- card serial number
- card's public key and/or certificate
- the card's response to a given challenge (where the response is defined as the encryption of the challenge by the card's private key. Note: this would typically require the user to submit the PIN to unlock the private key). This challenge and the corresponding card's response must be remembered by the reader. The challenge can be:
    - a fixed over-all challenge (same for all cards and all readers)
    - fixed challenge per reader
    - fixed challenge per card (e.g. randomly generated by the reader upon first presentation of the card and then remembered by the reader)
    - challenge provided by user
    - a combination of any of the above An example of this operation is illustrated in FIG. 6. The reader 600 awaits receipt of card data (function 616). The card provides some card data 611 to the reader (function 610). When the reader receives the card data 611, that data is stored (function 617).

Figure 7:
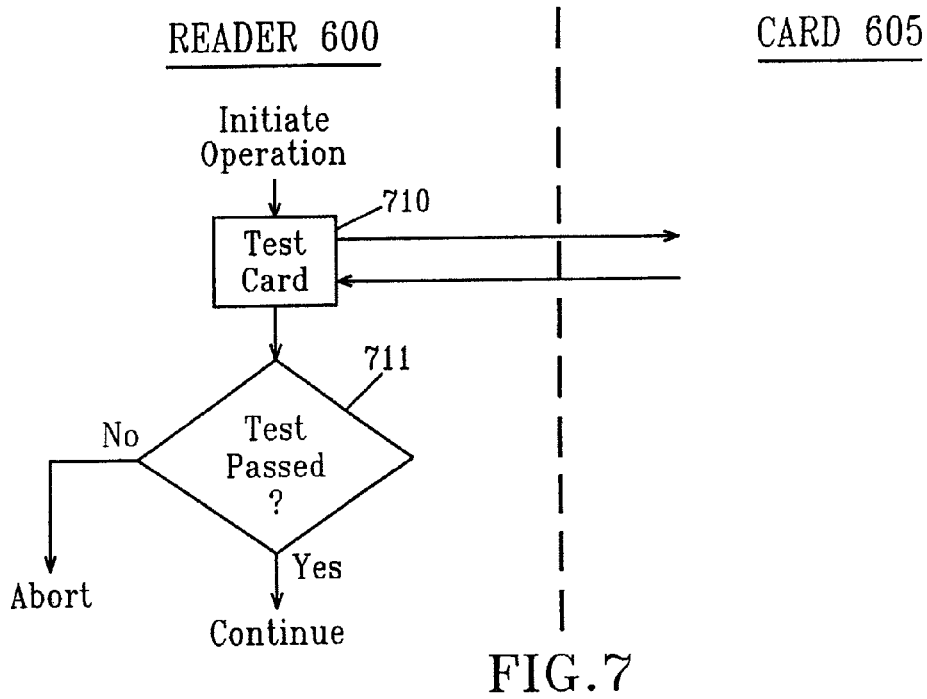

If the user wants to generate a dynamic password or signature (see FIG. 7), the reader asks for the card that was bound to that reader. The reader checks whether the presented card is indeed the expected card. I.e. it will retrieve the characteristics of the presented card (function 710) and compare them with the stored characteristics of the card bound to the reader (function 711). This step can include:
- reading the card's serial number
- reading the card's public key and/or certificate
- submitting a (stored) challenge to the card for encryption by the card's private key (which may require the user to provide the PIN to unlock the private key) and receiving the card's response.

Upon successful validation of the presented card, the reader proceeds with performing the strong authentication algorithm as an ordinary strong authentication token.

To strengthen the security, many variations are possible. The reader can derive the symmetric secret authentication key from:
- a data element pre-personalized in the reader,
- and/or a data element provided to the reader by the user,
- and/or a data element that the reader reads from the card.

Preferably, these data elements are secret. Instead of using always the same challenge and corresponding card response that was used and obtained when the card was bound to the reader, the reader can use multiple pairs of challenges and corresponding responses. Variations on this principle include:
- When the card is bound to the reader, the reader generates and submits more than one challenge to the card and remembers the corresponding card responses. When the reader later on needs to validate the card, it can submit any subset of these challenges to the card and check whether the card's responses match the stored responses.
- When the reader has successfully validated the inserted card, it can generate a new challenge and obtain a corresponding response from the card. This new challenge-response pair can then be remembered by the reader as an alternative or additional pair to the already previously known challenge-response pair(s).

These two variations can be combined.

Figure 8:
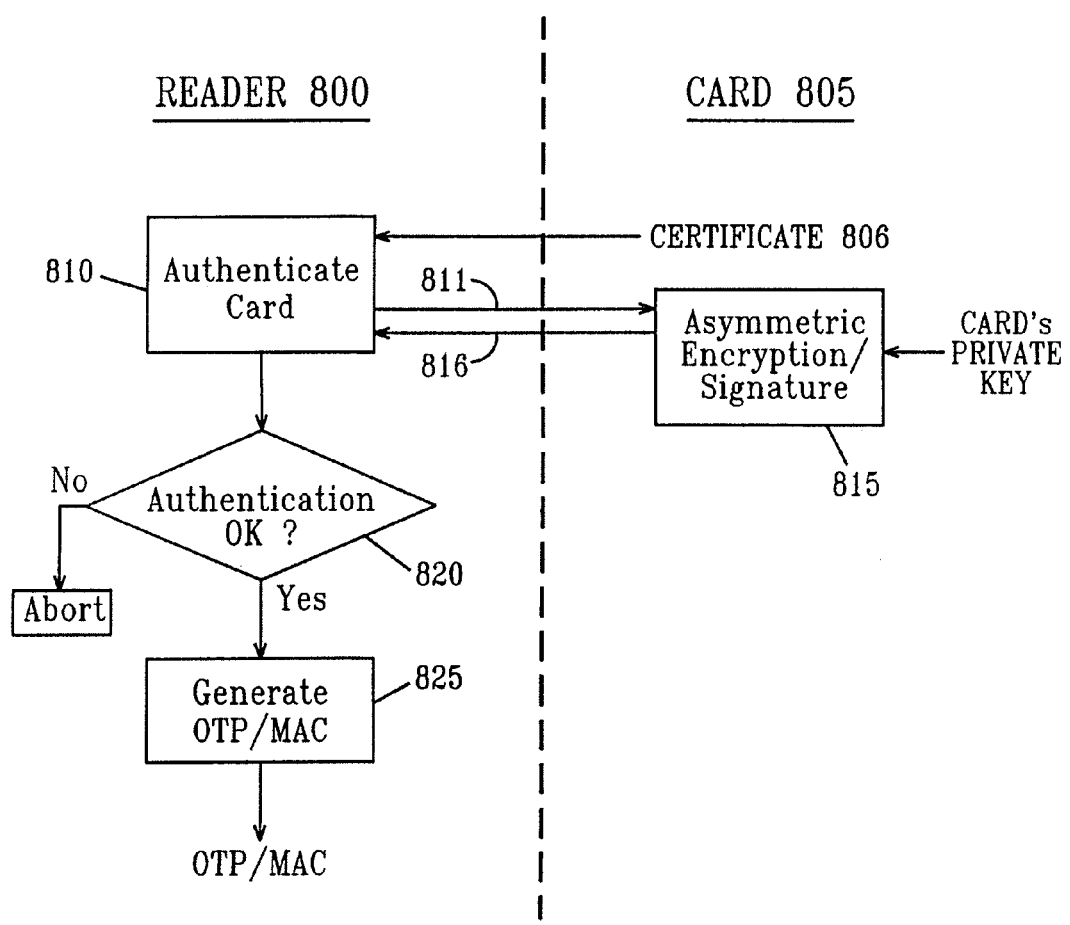
FIGS. 8 and 9 are flow diagrams of still another embodiment of the invention in which the smart card, including a PKI certificate, is used to authenticate the user to the reader, which in turn produces a cryptogram from which an OTP or MAC is derived, in this embodiment a random user may be authenticated.
Figure 9:
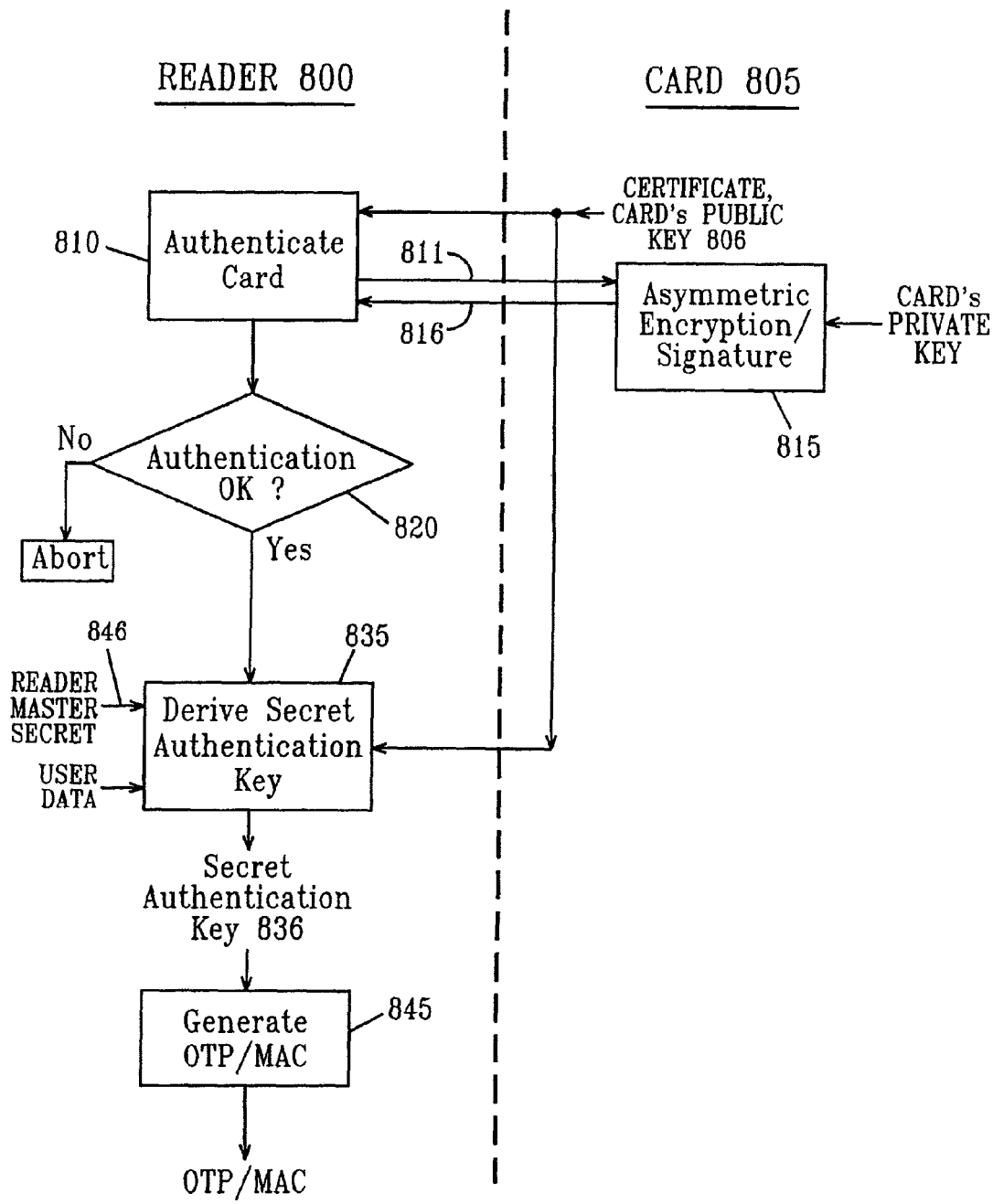

The principle of yet another embodiment (FIGS. 8 and 9) is as follows. On behalf of the server, the reader locally authenticates the user by means of a traditional certificate based authentication of the user's PKI card.

If the user was successfully authenticated by the reader, the reader generates an OTP or MAC (using a traditional strong authentication token algorithm) that can be validated by the validation server. The user can then submit this OTP or MAC to the server as proof that he has been successfully authenticated by the reader.

The reader locally authenticates the user by means of the user's inserted PKI card and using traditional PKI technology. In a typical embodiment this can be done as follows (refer to FIG. 8):

1. The reader 800 validates the card's certificate 806 (or certificate chain).
   a. Note: this assumes that the reader has access to the trusted public key of the (root) Certificate Authority. This can be done by storing the trusted public key of the (root) Certificate Authority in the reader.
   b. Note: the reader 800 does not have to do an explicit verification of the entire certificate (chain) starting from the (root) CA public key each time the card is inserted in the reader. Instead the reader 800 can do the entire verification when a card 805 is inserted for the first time into the reader. The reader can then store the verified certificate or the certificate's public key or a reference value derived from the verified certificate or public key (e.g. a hash of the certificate or public key). If the card 805 is then re-inserted at a later time, the reader 800 no longer has to do all the calculations associated with certificate validation, but can just compare the certificate on the card with the certificate or reference value stored in the reader.
2. The reader 800 does a challenge-response authentication of card's private key:
   a. Reader (810) generates a challenge 811, e.g. typically a random number or some other non-predictable value that is e.g. derived from a time value or counter value with a cryptographic algorithm using some secret stored in the reader.
   b. The user provides the PIN protecting the card's private key.
   c. The reader 800 submits the PIN to the card.
   d. The reader 800 submits a random challenge 811 to card to be encrypted by card's private key.
   e. The card signs (815) the reader challenge with its private key and returns response (=encrypted challenge 816).
   f. The reader 800 decrypts card's response with card's public key (from the certificate).
   g. The reader compares 820 decrypted card's response with originally generated challenge. If the decrypted card's response is the same as the originally generated challenge, then the card's private key is authenticated and hence the user is authenticated.

In essence the reader generates (825) an OTP/MAC in the same way as a traditional strong authentication algorithm. All the steps of this algorithm (capturing the inputs, formatting the inputs, encrypting or hashing the formatted inputs, transforming the resulting cryptogram of hash into an OTP/MAC) are done by the reader 800 in essentially the same way as a traditional strong authentication token. In one embodiment the reader is personalized with a symmetric secret strong authentication key. In that case the reader 800 is also typically configured to expect a specific card. The reader recognizes this card by means of some characteristic value of a data element of the card. Typically the card's certificate is used as such a data element. In other embodiments (see FIG. 9), in order to avoid having to personalize and configure the readers, the reader 800 derives (835) a card-specific value for the symmetric secret strong authentication key from the following data elements:
   public card data preferably related to the card's certificate or public key (e.g. card serial number, certificate serial number, public key, etc.)
   a master key 846 stored in the reader and known to the server. This master key can be:
      an identical value for all readers
      a specific/unique value for each individual reader. This requires some kind of assignment of the reader to the user, and registration of this assignment at the server.
   an (optional) extra derivation data element could be a (secret) data element that is provided to the reader by the user. The user must explicitly provide this data element:
      either, each time the reader and card are used in this way or,
      only when this card is used for the first time with this reader (after which the reader will remember the provided value of the data element for this card)

The reader 800 uses the derived card-specific symmetric authentication key 836 in a symmetric strong authentication algorithm (such as the Digipass algorithm or OATH) to generate (845) a dynamic password (challenge-response and/or time and/or event based) or generate (845) a MAC-type of electronic signature on some transaction data (optionally including time and/or event counter information).

A Server validates the generated dynamic password or signature as follows:
   The server derives the same card-specific symmetric strong authentication key as the reader. This assumes that the server has a database (or an alternative way of retrieving the required information) that links the user to:
   the public card data,
   the data element provided by the user (if applicable)
   and the reader's master key
      Note: instead of doing this derivation each time a validation must be done, the derivation can also be done once and the resulting derived key can be stored in a database for future use.
   The server validates the dynamic password or signature in the same way as it would do for a traditional strong authentication token.

Figure 10:
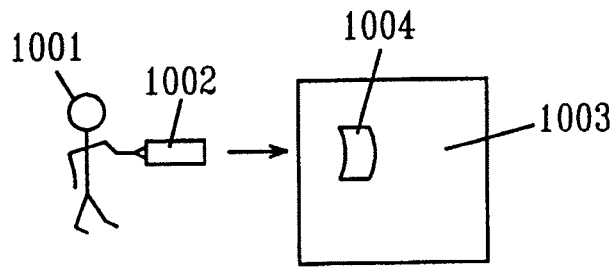
FIGS. 10 and 11 illustrate actions taken in an initial session to capture information allowing operation of various embodiments of the invention.
Figure 11:
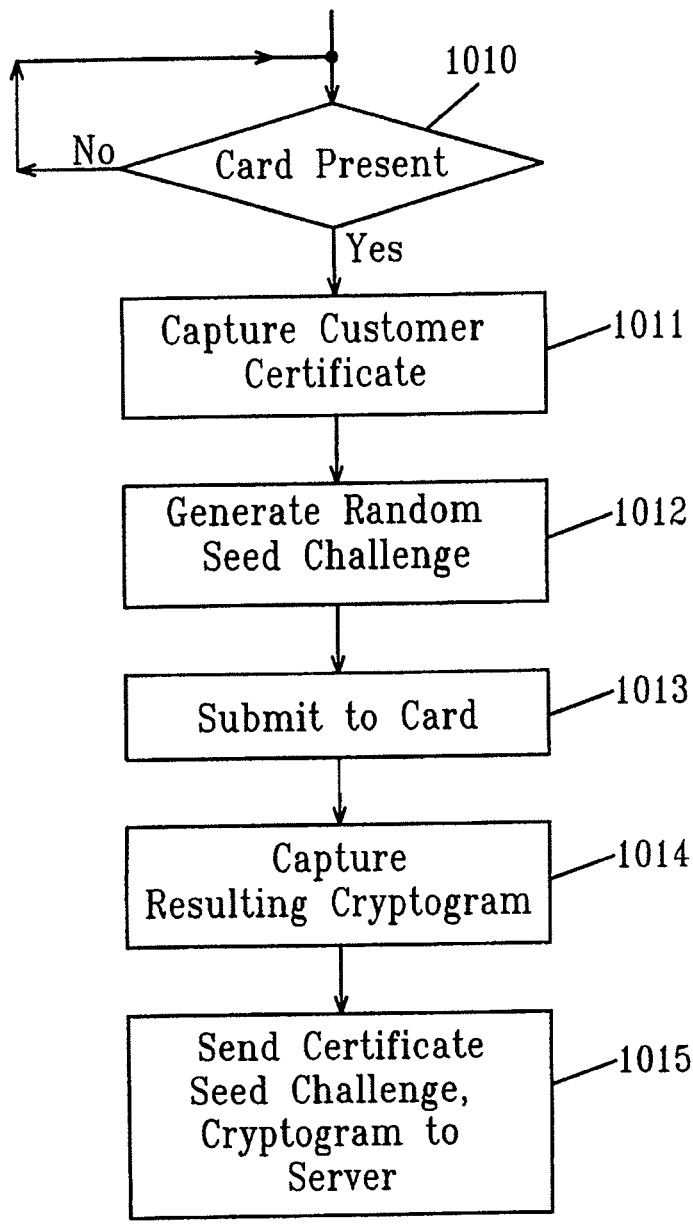

A typical embodiment operates as follows (FIGS. 10-11):

In an enlistment phase, a bank customer 1001 goes to a bank branch 1003. Using his national electronic identity card (e-id card 1002) with a Bank Branch Terminal (BBT), the customer electronically signs an e-banking contract 1004.

While the customer's e-id card is inserted in the BBT (1010), the BBT:
   captures the customer's certificate (1011),
   generates a random seed challenge (1012),
   submits the random seed challenge to the e-id card (1002) to be encrypted by the card's private key (1013),
   captures the card's cryptogram on that challenge (1014).

Finally, the BBT sends the customer's certificate, generated seed challenge, and the card's cryptogram on the seed challenge to a server (1015). The server stores this data in a database linked to the customer. The bank then delivers an unconnected smart card reader to the customer. This reader contains a secret master key. The bank also sends the customer a PIN mailer with the value of the seed challenge that was generated and used by the BBT. The authentication server is also informed of the value of the secret master key.

When the customer uses the reader for the first time:
The reader asks for the customer's e-id card to be inserted.
The reader also asks for the PIN mailer's seed challenge and stores it in memory.
The reader reads the card's certificate and stores it also in memory.
The reader generates a random reader challenge and submits it to the card to be encrypted by the card's private key. The reader stores both the reader challenge and the corresponding cryptogram generated by the card.

If the customer wants to generate an OTP (or MAC or response or . . . ) the reader goes through the following steps:
The reader asks for the customer's e-id card to be inserted.
The reader validates the card:
  The reader reads the card's certificate and compares it to the certificate that was stored.
  If that checks OK, the reader submits the stored reader challenge to the card for signature and compares the card's cryptogram with the stored cryptogram.
If the reader has successfully validated the card, the reader generates the secret authentication key:
  The reader submits the stored PIN mailer seed challenge to the card to be encrypted by the card.
  The reader now derives a secret authentication key from:
    the secret master key in the reader,
    the PIN mailer seed challenge,
    the card's cryptogram on that PIN mailer seed challenge,
    the card's certificate.
  The reader now uses the generated secret authentication key in a strong authentication algorithm (e.g. to generate an OTP or a MAC).

The authentication server is capable of verifying the resulting OTP (or MAC) since it had access to all the data necessary to generate the secret authentication key:
  the reader's secret master key,
  the card's certificate,
  the PIN mailer challenge,
  the card's cryptogram on the PIN mailer challenge.

Using the generated secret authentication key, the authentication server can validate the OTPs or MACs in the same way it would validate OTPs or MACs generated by traditional strong authentication tokens.

Alternatively the authentication server can use either of the procedures shown in FIG. 13 or 14 for a validation operation.

In connection with the procedure of FIG. 13, we assume that the cryptogram produced by the reader is transformed using a sequence of transform A (1306) and transform B (1307). For validation purposes the server subjects the OTP or MAC to the reverse transform B (1327) to produce a modified OTP or MAC and then subjects the reference cryptogram to transform A (1325) to produce the modified reference cryptogram. Finally the server effects a comparison of the modified reference cryptogram and the modified OTP or MAC.

In connection with the procedure of FIG. 14, we assume that the cryptogram produced by the reader is transformed using a sequence of the bit selection (1355), concatenation (1356) and bit string transformation (1357) as shown in FIG. 14 to produce the OTP or MAC. For validation purposes the server subjects the OTP or MAC to the bit stream and expansion processes 1359 and 1360 of FIG. 14 to produce a modified OTP or MAC. The server subjects the reference cryptogram to operation 1364 to produce the modified reference cryptogram. Finally the server effects a comparison (1365) of the modified reference cryptogram and the modified OTP or MAC to effect validation.

FIGS. 15-22 illustrate various aspects of a particular set of embodiments of the invention. The following devices and data elements play a role in these embodiments:

Devices

PKI Device

Figure 15:
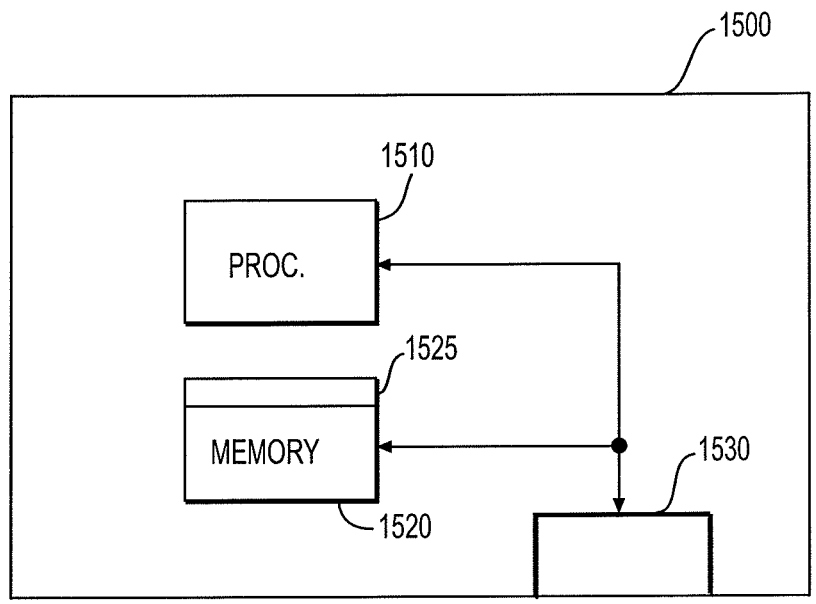
FIG. 15 is a diagram of one embodiment of a PKI device.

In the context of this set of embodiments a PKI device 1500 is an apparatus, illustrated in FIG. 15, comprising a memory 1520 for storing at least one private key of a public-private key pair and data processing means 1510 comprising one or more data processing components (such as an Infineon SLE66CLxxx microcontroller) to perform asymmetric cryptographic operations with this private key. The PKI device 1500 may also comprise a memory 1525 to store additional private keys and/or one or more public keys associated to these one or more private keys and/or one or more certificates associated with these one or more public keys. The asymmetric cryptographic calculations typically include the generation of digital signatures. The PKI device 1500 may furthermore be capable of other types of cryptographic operations. It may also store other types of data including user related data such as a user name or a unique number related to the user. In a typical embodiment the PKI device 1500 furthermore includes a communication interface 1530 to electronically communicate and exchange data with certain reader devices including to receive data from such a reader device, to receive instructions from the reader device to perform an asymmetric cryptographic operation with an asymmetric private key stored on the PKI device on certain data provided by the reader device, and to return a result of this asymmetric cryptographic operation. In a typical embodiment this includes digitally signing with a private key certain data provided by the reader device and returning the resulting signature. In some embodiments the communication interface 1530 may include a USB interface. In other embodiments the communication interface may include a smart card interface. In a typical embodiment the smart card interface is according to the ISO/IEC 7816 set of standards. In some embodiments the PKI device may comprise a USB token. In other embodiments the PKI device may comprise a smart card. In some embodiments the PKI device may be issued by a government agency to at least some citizens. The PKI device may for instance comprise an electronic national identity card. In other embodiments the PKI device may be issued by financial institutions for example to their customers. In still other embodiments the PKI device may be issued by a company offering telecommunication services. In some cases the PKI device may comprise a SIM (subscriber identity module) card. In some embodiments operations involving the usage of the PKI device's private key are protected by a PIN code. In typical embodiments the private keys stored in the PKI device are only known to the PKI device and cannot be read from it. In a particular embodiment the PKI device comprises a PKI smart card containing at least one public-private key pair with associated certificate capable of generating digital signatures with the private key whereby the usage of the private key is protected by a PIN code.

Reader Device

Figure 16:
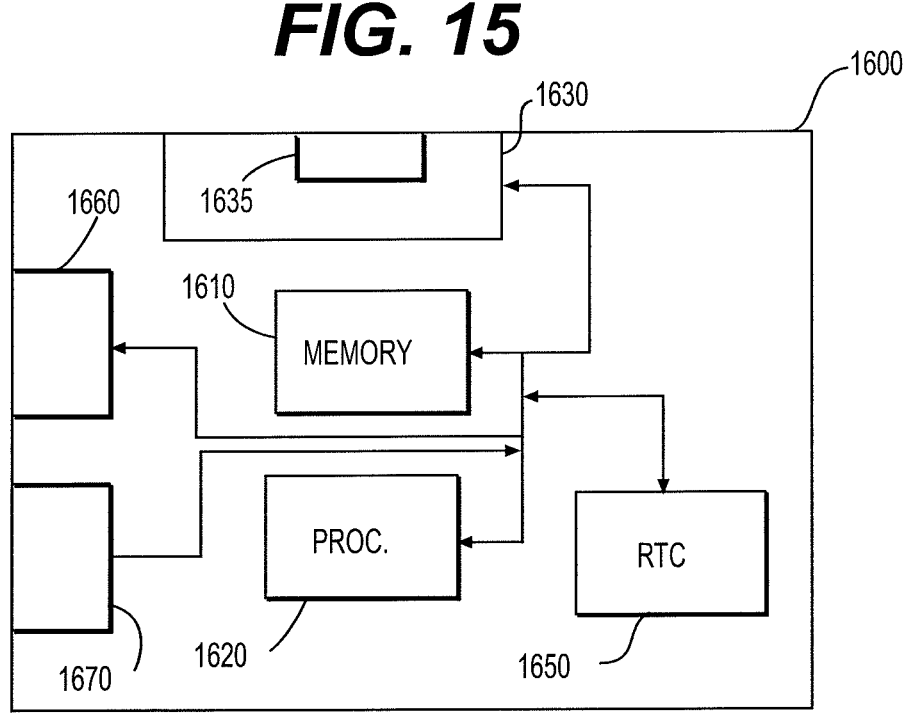
FIG. 16 is a diagram of an embodiment of a reader.
Figure 17:
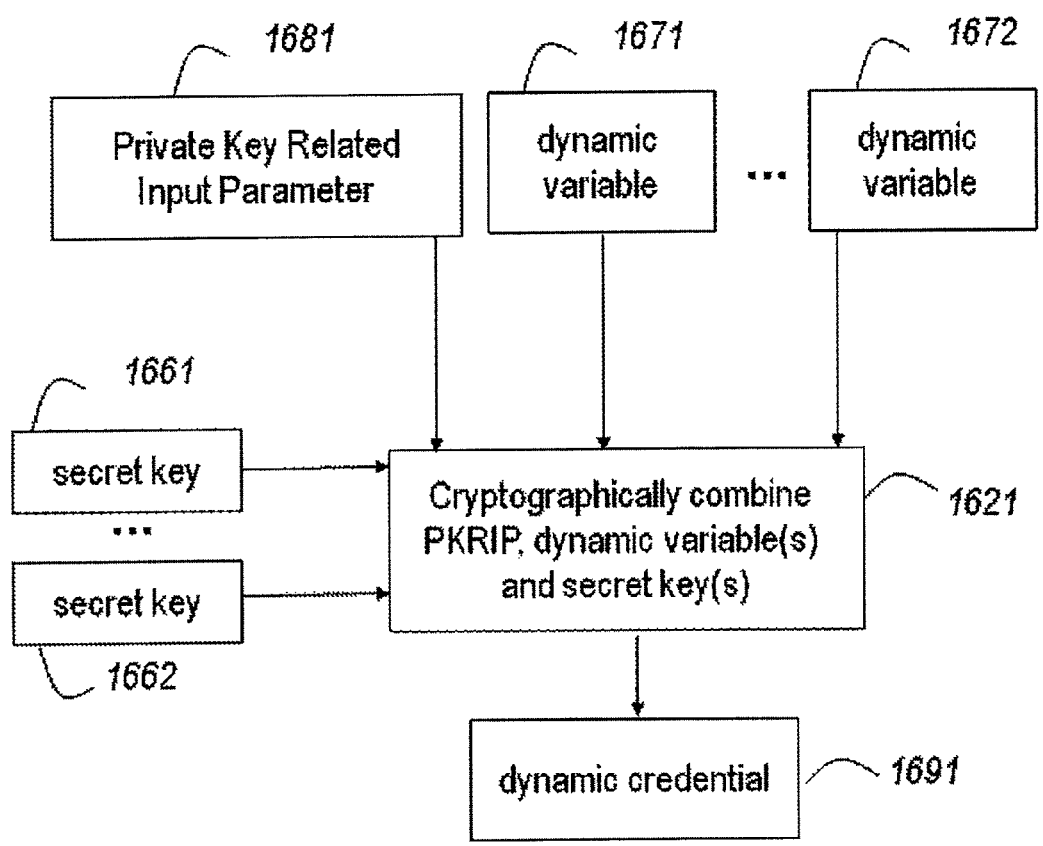
FIG. 17 represents the data employed in a protocol for creating a dynamic authentication credential in accordance with an embodiment of the invention.

In the context of this set of embodiments a reader device 1600 is an apparatus, illustrated in FIG. 16, comprising an electronic communication interface 1630 to electronically communicate and exchange data with certain PKI devices. In a typical embodiment this includes providing certain data to the PKI device and instructing the PKI device to perform an asymmetric cryptographic operation with an asymmetric private key stored on the PKI device on the data provided to the PKI device and receiving from the PKI device a result of this asymmetric cryptographic operation. In a typical embodiment this operation may comprise instructing the PKI device to digitally sign with a private key stored on the PKI device certain data provided by the reader device and receiving the resulting signature. In some embodiments the reader device's electronic communication interface 1630 may include a smart card reader 1635 to interface with PKI devices comprising a smart card. In a typical embodiment the smart card reader 1635 complies with the ISO/IEC 7816 set of standards. The smart card reader's smart card interface may also comply with the EMV specifications issued by EMVco (see www.emvco.com). In other embodiments the reader device's electronic communication interface 1630 may include a USB interface e.g. to interface with PKI devices comprising a USB token.

The reader device 1600 furthermore comprises a processor 1620 comprising one or more data processing components adapted to perform symmetric cryptographic operations. The data processing components may for example comprise a suitably programmed microprocessor, a microcontroller, an FPGA (Field Programmable Gate Array) or an ASIC (Application Specific Integrated Circuit). The data processing components may for example comprise a Texas Instruments MSP430 microcontroller. These symmetric cryptographic operations include the generation of a dynamic authentication credential, such as OTPs or electronic signatures, whereby the reader device's processor 1620 uses a symmetric cryptographic algorithm to combine at least one or more symmetric secret values with one or more dynamic variables and whereby the dynamic authentication credential is derived from the result of that combination. In a typical embodiment (see FIG. 17) the symmetric cryptographic algorithm 1621 generates dynamic credential(s) (1691) by combining at least one or more secret keys (1661, 1662, etc.) with one or more dynamic variables (1671, 1672, etc.) and also with a data element (Private Key Related Input Parameter (1681): see below) that is a function of a private key stored in a PKI device. In another embodiment the symmetric cryptographic algorithm generates dynamic credential(s) by combining one or more dynamic variables with a symmetric secret value that is or is derived from the Private Key Related Input Parameter. In some embodiments the symmetric cryptographic algorithm generating dynamic credentials may comprise a symmetric encryption or decryption algorithm such as DES or AES. In a typical embodiment the generation of a dynamic authentication credential comprises the encryption or decryption, with a secret symmetric key, using a symmetric encryption or decryption algorithm, of a combination of at least one or more dynamic variables with a Private Key Related Input Parameter. In some other embodiments the symmetric cryptographic algorithm may comprise a keyed-hash algorithm. In a typical embodiment the generation of a dynamic authentication credential comprises hashing a combination of a secret value, a dynamic variable and a Private Key Related Input Parameter. The dynamic variable may include a time related value, a counter value, a challenge provided by some application, transaction related data, or a combination of the aforementioned. In a specific embodiment the symmetric cryptographic algorithm comprises a known or standardized symmetric algorithm to generate OTPs or electronic signatures that combines a symmetric secret with a first external dynamic variable and a second internal or external dynamic variable and whereby the reader device assigns the value of a Private Key Related Input Parameter to the first external dynamic variable. The known or standardized symmetric algorithm to generate OTPs or electronic signatures may include an OATH or DIGIPASS challenge-response or transaction data signing algorithm.

The reader device 1600 may additionally comprise a real-time clock 1650 to provide a time-related value. It may also comprise a memory 1610 to store a counter value. It may furthermore comprise a memory 1610 to store one or more secret keys or secret values. It may also comprise one or more other memory components 1610 to store data such as a PKI device specific or private key specific challenge, or data related to a PKI device or a private key on the PKI device that permits the reader device later on to recognize that PKI device or that private key on the PKI device.

The reader device 1600 furthermore comprises one or more output components 1660 to output at least the dynamic authentication credential(s). In a typical embodiment the reader device may also use the output components to output a Private Key Code (see below). In some embodiments the output components 1660 comprise a display. Different types of displays can be used. The display may comprise for example a CRT (Cathode Ray Tube), LED (Light Emitting Diode), or LCD (Liquid Crystal Display) display. The output components may also comprise a display or LCD controller. In other embodiments the output components 1660 generate an output in acoustical form, such as an electromagnetic speaker. In other particular embodiments these output components are adapted to generate and output synthesized voice.

In some embodiments the reader device 1600 may furthermore comprise input components 1670 to receive data such as external dynamic variable values (e.g. a challenge or transaction data), or a PIN value e.g. to be submitted to a PKI device, or an Activation Code. In some embodiments the input components may comprise a keyboard or a keypad. In other embodiments the input components may comprise an optical interface comprising a plurality of light sensors.

In a typical embodiment the reader device has an autonomous power supply such as one or more batteries. In some embodiments these batteries may be replaceable.

Server-Side Components

The reader device described above is typically used by a user in conjunction with a user's PKI device for generating dynamic credentials to secure some computer-hosted application. In a typical embodiment the computer-hosted application interfaces with or comprises one or more authentication components for verifying dynamic credentials received from the application's users. Other server-side components may comprise one or more databases to store data linked to specific users such as a reader device identifying data element of a reader device associated with a specific user or the value of a Private Key Related Input Parameter associated with a specific user, and/or data linked to specific reader devices such a one or more secret keys.

Application Server

The computer-hosted application is typically hosted by an application server which the user can access via a network. In a typical case the application is web-based, the application server is a web server, the network is the internet, and the user can access the application by means of a browser on a web-enabled client device. In other embodiments the application may have an IVR (Interactive Voice Response) interface and the user may access the application via a telephone network. In still other embodiments the application is present on a local computer device that is directly accessed by a user. In all these cases, including the latter case we will refer to the application and its associated components as the server-side and server-side components.

Authentication Software/Server/Appliance

Figure 18:
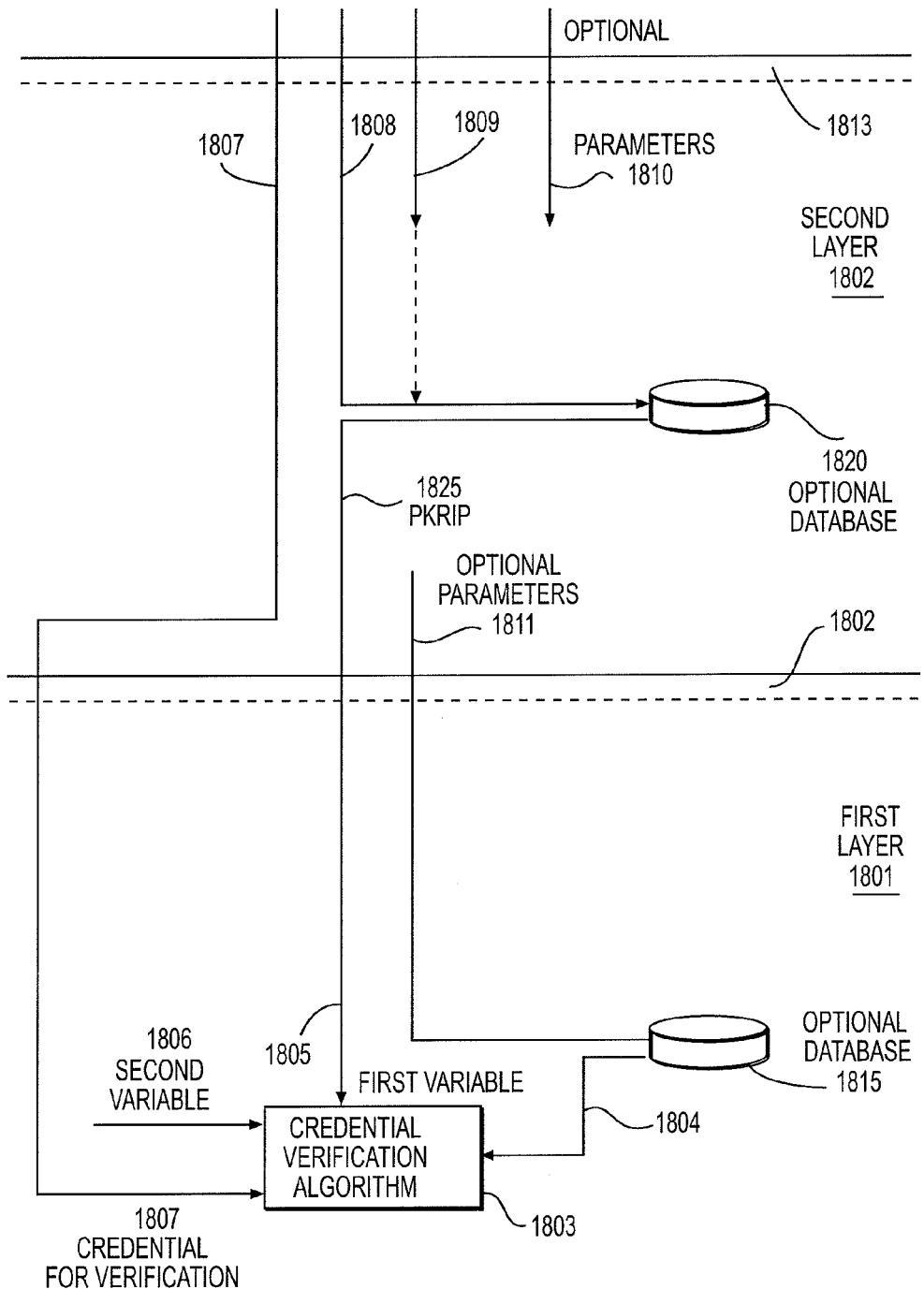
FIG. 18 schematically illustrates the architecture of server side components to verify dynamic credentials according to an embodiment of the invention.

One or more of the authentication components may comprise an authentication software library that is integrated into application software and that offers dynamic credential verification functionality to the application. In other embodiments one or more authentication components may comprise a stand-alone authentication server using some authentication protocol for verifying received dynamic credential(s). In some embodiments one or more authentication components may comprise an authentication appliance. In a typical embodiment, as illustrated in FIG. 18, two levels or layers can be distinguished in the one or more authentication components.

A first (inner or core) layer 1801 comprises one or more components for verifying dynamic credential(s) using an existing or standardized dynamic credential verification algorithm 1803 that cryptographically combines at least one symmetric secret key 1804 with at least a first external dynamic variable 1805 (such as a challenge or transaction related data) and a second internal or external dynamic variable 1806 (e.g. a counter or a time dependent variable). In some embodiments additional external or internal dynamic variables may also be used by the verification algorithm. The interface 1802 of this inner or core layer contains at least a function or functionality for verifying dynamic credentials whereby the calling component is expected to pass the dynamic credential 1807 and at least the value of the first external dynamic variable 1805 and, if applicable, also the values of the additional external variables. In some embodiments the symmetric secret key 1804 is also passed by the calling component through the interface. In other embodiments the calling component passes a data element 1811 related to the user identity or a reader identifier and the inner layer comprises one or more components 1815 to determine the value of the symmetric secret key using the received data element related to the user identity or a reader identifier. This determining of the value of the symmetric key may include a database search using the received data element 1811 related to the user identity or a reader identifier as a search key.

A second (outer layer) 1802 includes an interface 1813 that includes a function or functionality for verifying a dynamic authentication credential that has been generated by a reader device (1600) as described above in connection to the description of a reader device (FIG. 16). The interface 1813 of the outer layer allows a calling application to pass a dynamic authentication credential 1807 to be verified along with a value 1808 that is related to the identity of the user that is supposed to have submitted the dynamic credential or an identifier 1809 of the reader that is supposed to have generated the dynamic credential and may optionally also allow to pass one or more external dynamic variables 1816 such as a challenge or transaction data. The outer layer 1802 comprises one or more components that, using the received user identity related value 1808 or reader identifier 1809, determines or retrieves the value of a Private Key Related Input Parameter. Determining or retrieving the value of a Private Key Related Input Parameter 1825 may comprise doing a database search 1820 using the received user identity related value 1808 or reader identifier 1809 (or data related to it) as a search key. For the verification of the received dynamic credential the outer layer 1802 calls upon the inner layer 1801 passing it the received dynamic credential 1807 to be verified along with the obtained value of the Private Key Related Input Parameter 1825 which is assigned to the first external dynamic variable 1805 that the inner layer expects. If applicable the outer layer also passes the values of additional external dynamic variables (e.g. a challenge or transaction data) 1811 to the inner layer. In some embodiments, i.e. in cases the inner layer expects that the value of the symmetric secret key is passed through the interface, the outer layer comprises one or more components to determine the value of the symmetric secret key using the data element related to the user identity or a reader identifier that it received from the calling application. This determining of the value of the symmetric key may include a database search using the received data element related to the user identity or a reader identifier as a search key. In other embodiments the outer layer passes to the inner layer a data element 1811 related to the user identity or a reader identifier that the inner layer can use to determine the value of the symmetric secret key(s) 1804.

In some embodiments the dynamic credentials may have been generated using a User Identity Code (see below) in addition to the other data elements (symmetric reader key, PKRIP, dynamic variables). For verification of the received dynamic credentials the authentication components of the server-side also determine a User Identity Code value and then used in the verification calculations. In one embodiment the outer layer determines the User Identity Code and passes it to the inner layer as the value of an external dynamic variable that the inner layer expects (similarly to what is described above with respect to the Private Key Related Input Parameter).

In this way an embodiment of the invention can be produced by using, as the inner core, one or more existing components for verifying a dynamic credential which have not been designed to implement an embodiment of the invention disclosed herein, and adding only the outer layer comprising one or more components in accordance with embodiments of the invention disclosed herein.

Data Elements

User ID

In one set of typical embodiments users interact with an application or computer system and identify themselves to the application or computer system by means of User ID. In a preferred embodiment this User ID comprises a code that uniquely identifies each individual user. In some cases the User ID may comprise a name associated with the user. In other cases the User ID may comprise an account number. In some cases the User ID may comprise a number while in other case it might comprise an alphanumerical string. In some embodiments the User ID may be chosen by the application provider whereas in other embodiments the User ID may be chosen by the user.

Private Key Code and Private Key Related Input Parameter

The Private Key Related Input Parameter (PKRIP) is a data element that is used by the reader device 1600 to generate dynamic authentication credentials and that is used by the server-side to verify authentication credentials generated by the reader device. The Private Key Code is a data element that is originally generated at registration and enablement by the reader device 1600 and transported to the server-side and from which the server-side can calculate the PKRIP. The Private Key Code and the PKRIP are both a mathematical function of the user's private key from the user's PKI device. The reader 1600 mathematically derives the PKRIP from a cryptogram that is generated by the user's PKI device 1500 using the user's private key with an asymmetric cryptographic operation in response to a challenge (further also referred to as the PKRIP challenge) from the reader device. For example the PKRIP may be mathematically derived from the result of an asymmetric cryptographic operation, such as decryption or a signature, by the user's PKI device using the user's private key and an asymmetric cryptographic algorithm in response to a challenge from the reader device 1600. In some embodiments the deriving may include a hashing and/or truncation operation. In other embodiments the deriving may also include cryptographically combining a secret with data mathematically related to the private key or specifically the result of a decryption or a signature by the user's PKI device using the user's private key with an asymmetric cryptographic operation in response to a challenge from the reader device. In still other embodiments the deriving may also include combining other types of data with data mathematically related to the private key or more specifically to the result of a decryption or a signature by the user's PKI device using the user's private key with an asymmetric cryptographic operation in response to a challenge from the reader device. In some embodiments these other types of data may include data specific for the reader device such as a reader device serial number, or data specific for the user such as the user's name or a user identifier which in some embodiments may be provided by the user to the reader device, or data specific to the PKI device such as a serial number, or data specific for the private key such as data from or related to the public key or a certificate associated with the private key, or data specific to an application provider which in some embodiments may be provided by the user to the reader device. The algorithm to derive the PKRIP could make use of the following extra data elements:

1. A fixed value that is the same for all reader devices of a certain batch.
2. A fixed value that is fixed for a given reader device but that has a different value for each reader device.
3. A fixed value that is constant for a given user but that can be different for different users and that is entered at least once in the reader device by the user.
4. Static data stored on the PKI device that can be read by the reader device (e.g. data associated with the private key such as the public key and certificate, or a serial number of the PKI device).
5. A combination of any of the above.

In typical embodiments the PKRIP challenge is a value that is determined or calculated by the reader device in a way that the reader device can re-determine or re-calculate the same value of the PKRIP challenge later on for the same PKI device or the same private key on the PKI device. In a typical embodiment the PKRIP challenge comprises a secret or an unpredictable value. In some embodiments the PKRIP challenge is a constant or is derived from a constant that is stored in the reader device. In a specific embodiment this constant is the same for a plurality of reader devices. In another specific embodiment this constant is specific to an individual reader device. In some typical embodiments this constant is a secret. In other embodiments the PKRIP challenge is or is derived from a random or pseudo-random value. In some embodiments after generation of the PKRIP challenge the reader device stores in persistent memory for later use a value that permits to re-determine or re-calculate the PKRIP challenge. In one embodiment this stored value may be the PKRIP challenge itself. In some embodiments this value is stored together with information that is related to the PKI device or the user's private key on the PKI device that permits the reader device to recognize the PKI device or the private key on the PKI device. This information may comprise a serial number of the PKI device or data from or related to the private key on the PKI device. In some embodiments, the PKRIP challenge could for example comprise or could be derived from any of the following:

1. A fixed value that is the same for all reader devices of a certain batch.
2. A fixed value that is fixed for a given reader device but that has a different value for each reader device.
3. A fixed value that is constant for a given user but that can be different for different users and that is entered at least once in the reader device by the user. In practice it is very likely that this value will be entered either every time the PKI device is used, or only the first time that a given PKI device is used with a certain reader device and will then be remembered by the reader device.
4. Static data stored on the PKI device that can be read by the reader device (e.g. the public key and certificate, or a PKI device serial number).
5. Data specific to a particular application provider which in some embodiments may be provided by the user to the reader device.
6. A combination of any of the above.
7. A value derived from any of the above. The derivation optionally including the use of some reader device secret.

The Private Key Code is generated by the reader device and is mathematically related to the PKRIP. In a typical embodiment the Private Key Code is generated such that the server-side can calculate the value of the PKRIP from the Private Key Code value. In some embodiments the server-side also uses additional data elements that it has access to to calculate the PKRIP from the Private Key Code value. In some embodiments these additional data elements may include secret data also known to the reader device, or data related to the user that are accessible to the server-side such as a user name or a User ID, or data related to the reader device and accessible to the server-side such as a reader device serial number (which in some embodiments may be provided to the server-side by the user at registration), or data related to the PKI device such as a serial number, or data related to the private key stored on the PKI device which is accessible to the server-side (in some embodiments this may include data from or related to the public key or a certificate associated with the private key and which the server-side can access e.g. in a database). In some embodiments the Private Key Code is an intermediate data element that the reader device generates when generating the PKRIP. In other embodiments the reader device mathematically derives the Private Key Code from the PKRIP after it has generated the PKRIP. In a particular embodiment the Private Key Code is the same as the PKRIP. In a typical embodiment the Private Key Code is generated by the reader and transported at registration to the server-side to allow the server-side to calculate or otherwise obtain the value of the PKRIP that the reader device has calculated.

Activation Key and Activation Code

The Activation Key is a symmetric secret key that is used in some embodiments when registering and enabling a user's PKI device or more specifically the private key stored in that PKI device that is used to generate the PKRIP. In a typical embodiment the Activation Key is used at registration for securing the transport to the server side of the Private Key Code generated by the reader device. In one embodiment the Activation Key is known to or calculated by the reader device at registration. In one embodiment the Activation Key is used by the reader device to encrypt the Private Key Code which is then in encrypted form transported from the reader device to the server-side. In one embodiment the Activation Key is also known to or calculated by the server-side at registration. In one embodiment the server-side receives the encrypted Private Key Code and decrypts the encrypted Private Key Code with its copy of the Activation Key.

In some embodiments the Activation Key is derived from a symmetric secret known to both the reader device and the server-side. In one embodiment the Activation Key is a symmetric secret known to both the reader device and the server-side. In another particular embodiment the Activation Key is derived from a cryptographic combination of a dynamic variable such as a time-related variable or a challenge with a symmetric secret.

In some embodiments the Activation Key is derived from a symmetric secret that is already present in the reader device before the reader device is distributed to the user. In one embodiment the Activation Key is a symmetric secret that is already present in the reader device before the reader device is distributed to the user. In a specific embodiment the Activation Key is loaded in the reader device as part of a production step and communicated to the server-side prior to registration of the user's PKI device or more specifically the private key stored in that PKI device that is used to generate the PKRIP.

In some embodiments the Activation Key is derived from a data element which is generated at the server side and after generation provided to the reader device. This data element is further referred to as the Activation Code. In a typical embodiment the Activation Code is provided to the reader device by the user. In some embodiments the user may enter the Activation Code on the keyboard of the reader device. In some embodiments the user receives the Activation Code via a delivery channel that is deemed to provide a sufficiently high level of security. In one embodiment the Activation Code is delivered to the user when the user has logged in using an older authentication technology (e.g. using a static password). In another embodiment the Activation Code is sent by mail (e.g. registered mail) to the user. In yet another embodiment the user can get the Activation Code via an ATM (automatic teller machine) machine e.g. after having inserted a bank card and having entered the PIN associated with that bank card. In still another embodiment the Activation Code is sent via a text message or SMS (short message service) message to a mobile phone that is deemed to be under control of the user. In still another embodiment the Activation Code is sent via e-mail to an e-mail account that is deemed to be under control of the user.

In some embodiments the derivation of the Activation Key uses data elements that are specific for the reader device such as a reader device serial number, or data elements that are specific for the user such as the user's name or a user identifier which in some embodiments may be provided by the user to the reader device.

User Identity Code

In some embodiments the User Identity Code is a data element that the reader device can derive from a data element that is stored on the PKI device and that can be accessed by the reader device and that is representative for or linked to the identity of the legitimate holder of the PKI device, and that is also accessible to the server-side e.g. by accessing a public database if the identity of the legitimate holder of the PKI device is given. Examples of such data elements may include the PKI device holder's name, or PKI device holder's address, or (for example in case the PKI device comprises a national ID card) a PKI device holder's national number which may be unique for each PKI device holder, or (e.g. in case the PKI device has been issued by a financial institution) a PKI device holder's account number. In some embodiments this data element may be comprised in a certificate associated with the PKI device holder's private key on the PKI device. In some other embodiments the server-side may have access to a database containing certificates or public keys associated with private keys of users. The data element from which the User Identity Code is derived may then comprise parts of a certificate or public key associated with a user's private key on the PKI device. The User Identity Code may allow the server to perform a check on whether the identity that the user claims corresponds to the identity of the legitimate holder of the PKI device that the user is using.

In one embodiment the User Identity Code is derived by the reader device during the registration phase from a data element on the PKI device that the user is using, and is then communicated to the server side. To verify that the identity that the user claims corresponds to the identity of the legitimate holder of the PKI device that the user happens to use, the server side may generate a similar value from a data element that corresponds to the data element on the PKI device, that is accessible to the server-side and that the server-side can retrieve on the basis of the identity that the user claims. The server side may then compare the received User Identity Code with the value that it computed itself. If the identity claimed by the user indeed corresponds to the identity of the legitimate holder of the PKI device that the user happens to use, then this comparison should give a positive result.

In another embodiment the User Identity Code is derived by the reader device when it generates dynamic credentials and cryptographically combined with other data elements (symmetric reader secret, PKRIP, dynamic variables) to generate the dynamic credentials. When verifying a dynamic credential the sever-side determines the value of the User Identity Code on the basis of the identity that the user claims to have. If the user claims to have an identity that is different than the identity of the legitimate holder of the PKI device that the user is using, then the User Identity Code derived by the reader device and the User Identity Code determined by the server-side will be different and the verification by the server side of the dynamic credential can be expected to produce a negative result. This provides an implicit method for the server side to verify that the identity that the user claims corresponds to the identity of the legitimate holder of the PKI device that the user happens to use.

Methods

Securing an Application

Figure 19:
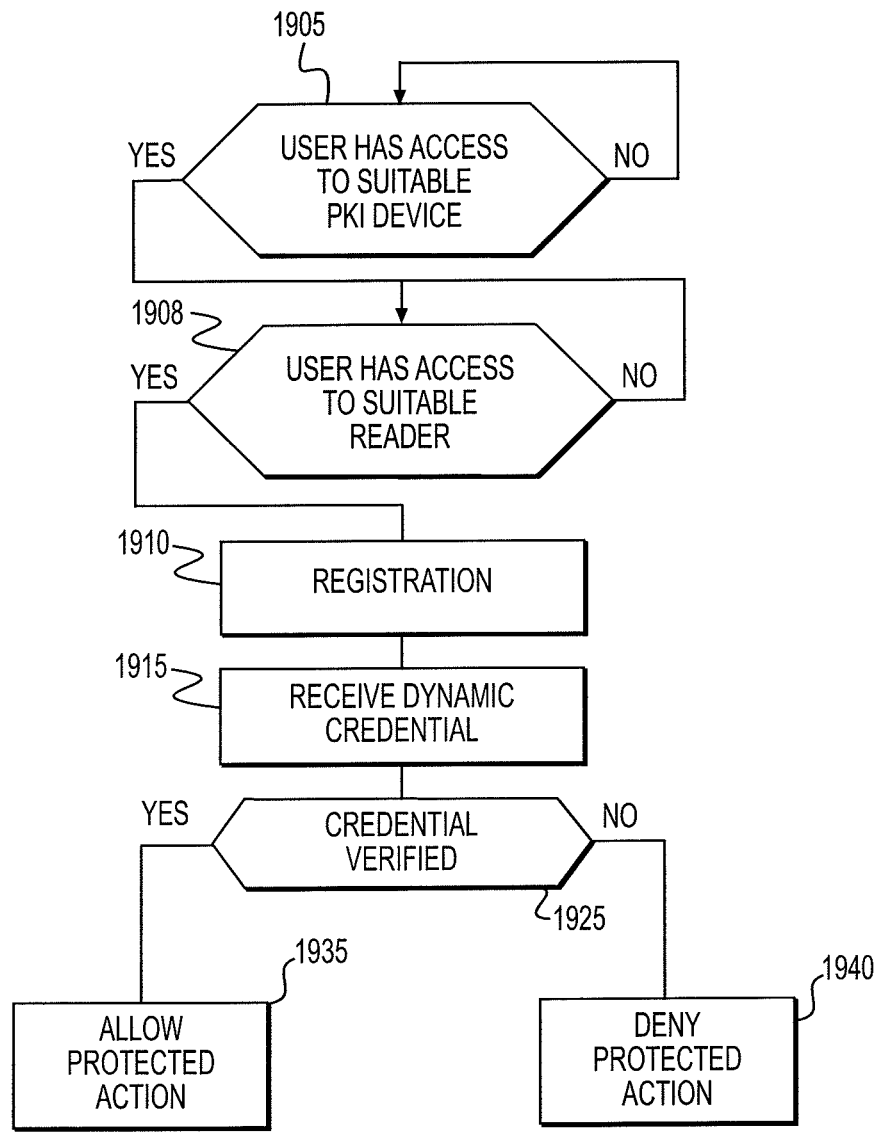
FIG. 19 illustrates a method for securing an application in accordance with an embodiment of the invention.
Figure 20:
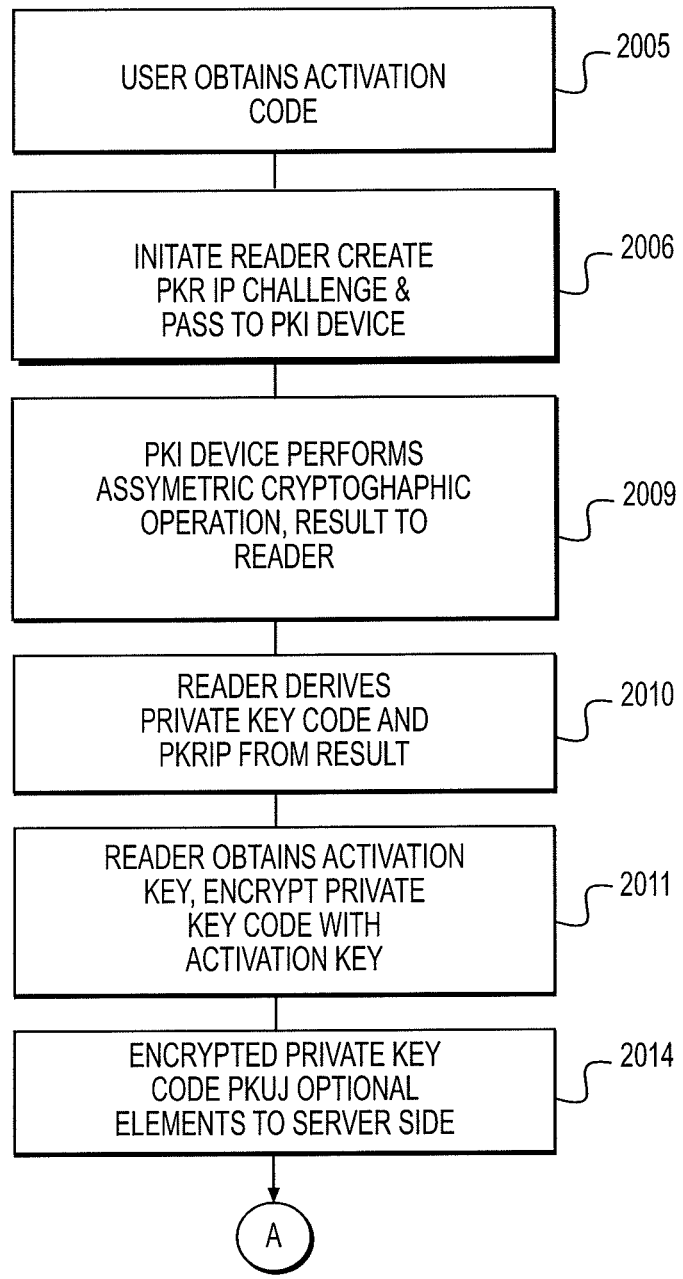
FIGS. 20A and 20B illustrate a method for registering or enabling a user's private key in accordance with an embodiment of the invention.
Figure 20:
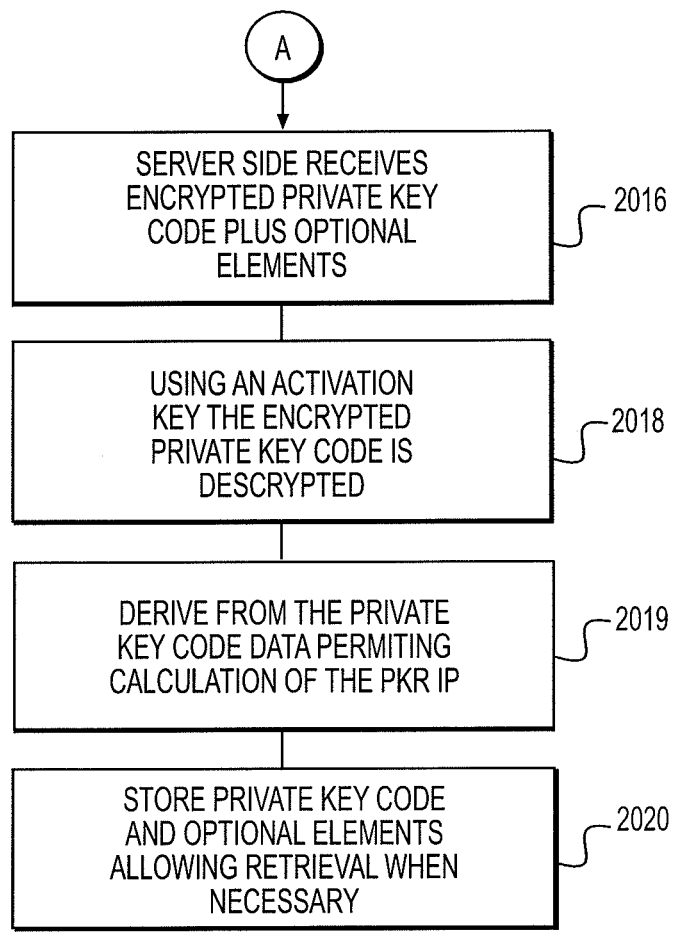

In some embodiments a method, as illustrated in FIG. 19, for securing a user's accessing and/or interacting with a computer-based application may comprise the following steps:

Ensuring for a plurality of users that each user has access to a PKI device linked to that user 1905; said PKI device storing a private key and adapted to perform asymmetric cryptographic operations with that private key and having a communication interface to electronically communicate and exchange data with compatible reader devices including to receive data from such a reader device, to receive instructions from the reader device to perform an asymmetric cryptographic operation with an asymmetric private key stored on the PKI device on certain data provided by the reader device, and to return a result of this asymmetric cryptographic operation. In some embodiments the PKI device may comprise a smart card or a USB token. In some embodiments this step may be optional or implicit e.g. in cases where users can by default be assumed to have a usable PKI device. This may for instance be the case in a country where all citizens receive a national ID card that is PKI enabled. In other embodiments e.g. in the case of a financial institution issuing PKI devices this step may comprise ensuring that for each user a public-private key pair is generated and stored on a PKI device, that the public key of that key pair is certified and linked to the appropriate user, that the PKI device is provided to the appropriate user, and (optionally) that a PIN mailer is sent to the appropriate user.

Ensuring for a plurality of users that each user gets a reader device as described above 1908; said reader device being suitable to handle Activation Keys and Activation Codes and to generate Private Key Codes, Private Key Related Input Parameters and dynamic authentication credentials as described above and below.

- Registering 1910 for each of a plurality of users the private key on a PKI device associated with each user (see below for a description of the registration step)
- Receiving from a plurality of users dynamic credentials that have been generated by these users using their PKI device and reader device 1915 (see below for a description of the generation of the dynamic credentials)
- Verifying the received dynamic credentials 1925 (see below for a description of the verification of the dynamic credentials)
- Taking appropriate action depending on the outcome of the verification step. For example in some embodiments users may gain access 1935 to an application after successful verification of an OTP and may be refused access 1940 in case the verification of the OTP was unsuccessful. In other embodiments instructions or transactions received by a user may be performed after successful verification of an OTP or an electronic signature on the instruction or transaction data and may be refused in case the verification of the OTP or electronic signature was unsuccessful.

In some embodiments the application to be secured comprises a financial application such as an internet-banking application. In other embodiments the application to be secured comprises an e-government such as electronically submitting a tax-declaration. In still other embodiments the application to be secured comprises a social security or health-care related application such as interacting with a medical insurance. In yet other embodiments the application to be secured comprises a lottery application.

Registration/Enablement of a Private Key

As illustrated in FIGS. 20A and 20B, the step of registering a user's private key on a user's PKI device comprises in a typical embodiment the following steps:

- In some embodiments an Activation Code is provided 2005 to the user.
- The user takes his/her reader device and PKI device to perform the following steps.
- The reader device obtains a PKRIP and Private Key Code which in turn comprises the steps of:
  i. Generating a PKRIP challenge as described above.
  ii. Sending the PKRIP challenge to the PKI device 2006 and instructing the PKI device to perform an asymmetric cryptographic operation on that PKRIP challenge with a private key stored in the PKI device and receiving from the PKI device the result of that operation 2009.
  iii. Deriving from the result of that operation a first value called Private Key Code and (optionally) a second value called PKRIP 2010.
- The reader device obtains an Activation Key and encrypts the generated Private Key Code with the obtained Activation Key 2011. In some embodiments the reader device first obtains an Activation Code and derives the Activation Key from the obtained Activation Key. In a typical embodiment the user provides the Activation Code to the reader device (e.g. by entering it on the reader device's keypad). In another typical embodiment the Activation Code is a representation of the Activation Key.
- In some embodiments the reader device also obtains a data element from the PKI device that is linked to the user's identity and which can also be obtained by the server-side, and generates from that data element a User Identity Code.
- In some embodiments the reader device also generates a dynamic credential using the PKRIP.
- The encrypted Private Key Code, and if applicable also the User Identity Code and/or the generated dynamic credential, are communicated to the server-side 2014. In some embodiments also a value that allows the server-side to identify the user's reader device (such as a reader device's serial number) is communicated to the server-side. In a typical embodiment communication of these data elements from the reader device to the server-side is done by the user e.g. by reading these data elements from the reader device's display and copying them on a web-page of the server-side.
- The server-side receives the encrypted Private Key Code and if applicable the User Identity Code and/or the generated dynamic credential and/or a reader device identifying data element 2016.
- The server-side also obtains a copy of the Activation Key. In some embodiments the server-side obtains a copy of an Activation Code that has been provided to the user and derives the Activation Key from that copy of the Activation Code. In some other embodiments the server-side obtains from a database a value from which the Activation Key can be derived. In some embodiments the server-side obtains from a database the value of the Activation Key itself.
- The server-side decrypts the received encrypted Private Key Code 2018.
- The server-side derives from the Private Key Code a value that permits the server-side to calculate the corresponding PKRIP and stores that value linked to the user e.g. in a database 2019. In some embodiments this value may be the Private Key Code. In other embodiments this value may be the PKRIP itself.
- If applicable the server-side uses the reader device identifying element to retrieve reader device specific data elements (such as a reader device specific configuration parameter or secret key) used in the calculation or verification by the server-side of data elements generated by the reader device. These data elements generated by the reader device that are also calculated or verified by the server-side may include the Activation Key, the PKRIP, the User Identity Code, and/or any dynamic credential (such as an OTP or electronic signature) generated by the reader device. If applicable the server-side may store the reader device identifying element linked to the user for later use. In a typical embodiment the reader device uses one or more reader device specific secrets in the generation of dynamic credentials and the server-side stores the reader device identifying element in a database linked to the user and uses that stored reader device identifying element to retrieve the one or more reader device specific secrets from another database (which stores these one or more reader device specific secrets linked to the reader device identifying element) when verifying dynamic credentials provided by the user. The server side then stores data (2020) allowing retrieval of the PKRIP to allow retrieval when necessary for a verification operations. This may involve storing the Private Key Code or the PKRIP or other data linked to the user.
- If applicable the server-side may derive its own copy of the User Identity Code and compare it to the received User Identity Code. In some embodiments the registration fails or is refused if this comparison fails.

If applicable the server-side may verify the received dynamic credential. In some embodiments the registration fails or is refused if this verification fails.

Generation of Dynamic Credentials

Figure 21:
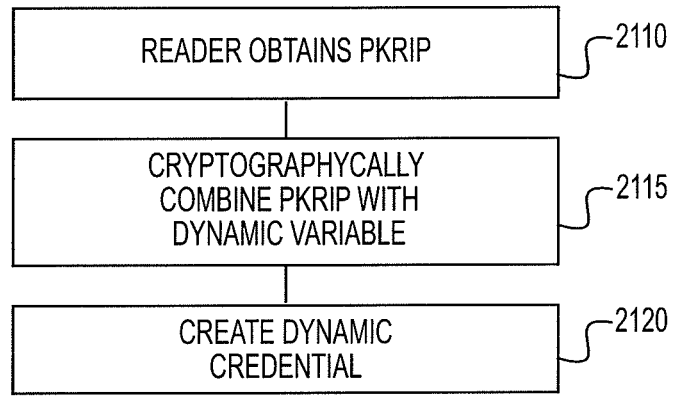
FIG. 21 illustrates a method for generating dynamic credentials in accordance with an embodiment of the invention.

In a typical embodiment a reader device generates dynamic credentials according to a method, illustrated in FIG. 21, that comprises the following steps:

- The reader device obtains a PKRIP 2110, see below for a detailed description
- The reader device cryptographically combines this PKRIP with one or more dynamic variables using a symmetric cryptographic algorithm 2115.
- In some embodiments the combining also involves one or more symmetric reader secrets.
- In some embodiments the combining also involves a User Identity Code.
- Thereafter the resulting cryptogram is transformed into a dynamic credential 2120.

In some embodiments obtaining the PKRIP comprises generating a PKRIP challenge, sending this PKRIP challenge to a PKI device, instructing the PKI device to perform an asymmetric cryptographic operation on the PKRIP challenge using a private key stored on the PKI device, receiving from the PKI device the result of that asymmetric operation, and mathematically deriving the PKRIP from the received result of the asymmetric operation. In some embodiments said asymmetric operation comprises the generation of a digital signature with a private key stored on the PKI device and said result of the asymmetric operation comprises the resulting digital signature. In some embodiments deriving the PKRIP from the received result of the asymmetric operation comprises combining the result of the asymmetric operation with data stored in the reader device. In some embodiments these data stored in the reader device may comprise data specific to an individual reader device. In other embodiments these data stored in the reader device may comprise one or more secret values or keys.

In some embodiments cryptographically combining the PKRIP with one or more dynamic variables using a symmetric cryptographic algorithm comprises combining the PKRIP and one or more dynamic variables with one or more secret values stored in the reader device using a symmetric cryptographic algorithm. In some embodiments these one or more secret values comprise a secret value that is common to a plurality of reader devices. In some other embodiments these one or more secret values comprise a secret value that is specific for an individual reader device.

In some embodiments the reader device may derive a User Identity Code as described above and cryptographically combining the PKRIP with one or more dynamic variables using a symmetric cryptographic algorithm comprises combining the PKRIP and one or more dynamic variables and the derived User Identity Code. In some embodiments cryptographically combining the PKRIP with one or more dynamic variables using a symmetric cryptographic algorithm comprises combining the PKRIP and one or more dynamic variables and the derived User Identity Code with one or more secret values stored in the reader device using a symmetric cryptographic algorithm.

In a specific embodiment cryptographically combining the PKRIP with one or more dynamic variables using a symmetric cryptographic algorithm comprises applying to the PKRIP, the one or more dynamic variables and a symmetric secret value stored in the reader device, a known or standardized symmetric algorithm to generate OTPs or electronic signatures that combines a symmetric secret with a first external dynamic variable and at least a second internal or external dynamic variable and whereby the reader device assigns the value of a Private Key Related Input Parameter to the first external dynamic variable and the symmetric secret value stored in the reader device to the symmetric secret and one of the one or more dynamic variables to the at least a second internal or external dynamic variable.

Verification of Dynamic Credentials

Figure 22:
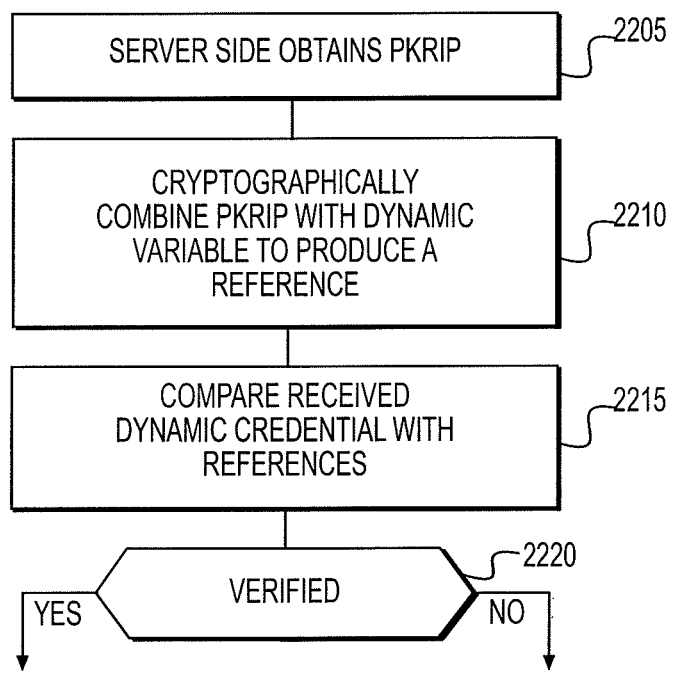
FIG. 22 illustrates a method for verifying a dynamic credential in accordance with an embodiment of the invention.

In a typical embodiment a dynamic credential that has been received (1915, FIG. 19) is verified (1925, FIG. 19) at the server-side according to a method, illustrated in FIG. 22, that comprises the following steps:

- The server-side obtains a PKRIP 2205.
- The server-side cryptographically combines this PKRIP with one or more dynamic variables using a symmetric cryptographic algorithm to obtain a reference 2210.
- The server-side compares this reference with the received dynamic credential 2215 and determines whether the credential is verified 2220.

In some embodiments obtaining the PKRIP comprises retrieving from a database a data element that is linked to the user and which permits the server-side to calculate the corresponding PKRIP. In some embodiments this value may be the Private Key Code. In other embodiments this value may be the PKRIP itself. In some embodiments the server-side combines this data element with other data elements. In some embodiments these other data elements may comprise data elements that may be linked to the reader or to the user to calculate the PKRIP. In some embodiments these other data elements may comprise one or more secret keys.

In some embodiments cryptographically combining the PKRIP with one or more dynamic variables using a symmetric cryptographic algorithm comprises combining the PKRIP and one or more dynamic variables with server-side copies of one or more secret values stored in a reader device. In some embodiments these one or more secret values comprise a secret value that is common to a plurality of reader devices. In some other embodiments these one or more secret values comprise a secret value that is specific for an individual reader device. In some embodiments the server-side retrieves these one or more secret values from a database that stores these values linked to a user identifying data element or linked to a reader device identifying data element.

In a specific embodiment cryptographically combining the PKRIP with one or more dynamic variables using a symmetric cryptographic algorithm comprises applying to the PKRIP, the one or more dynamic variables and a server-side copy of a symmetric secret value stored in a reader device, a known or standardized symmetric algorithm to generate OTPs or electronic signatures that combines a symmetric secret with a first external dynamic variable and at least a second internal or external dynamic variable and whereby the server-side assigns the value of a Private Key Related Input Parameter to the first external dynamic variable and the symmetric secret value stored in the reader device to the symmetric secret and one of the one or more dynamic variables to the at least a second internal or external dynamic variable.

In a particular embodiment reader devices are being made available to a plurality of users. The reader devices may be distributed by an application provider to some of its users e.g. by mail. The reader devices may also be for sale in e.g. a supermarket or on web shop. The reader devices are adapted to interact with a PKI device e.g. a smart card that is issued by a government agency to citizens to act as electronic id card for those citizens and that contains a private key and associated certificates and that is capable of asymmetric cryptographic operations with the private key e.g. to generate a digital signatures or to decrypt data encrypted with the public key associated with the private key. All readers contain a certain challenge which is the same for all readers. All reader devices also contain a symmetric reader secret which is the same for all reader devices. The application provider provides the users with a personal Activation Code in a secure way e.g. by sending them using registered mail. The Activation Codes may consist of a sequence of decimal digits. The value of each Activation Code is secret and personalized for each user. The Activation Codes are determined such that it is difficult for an outsider to predict the values. They may for example be random numbers or by derived by cryptographically combining a secret key with a User ID. To detect typographic errors the Activation Code may have a check digit. The application provider keeps track which user has received which Activation Code The application provider invites the users to register themselves. To register, a user logs in and authenticates using an existing authentication mechanism e.g. using a static password in combination with his/her User ID. The user then inserts his or her PKI device (e.g. their electronic ID card) into his or her reader device and enters his or her Activation Code on the reader device. The reader device requests the user to insert his/her PKI device and to enter the PKI devices PIN. The reader device submits the PIN to the PKI device for verification. The reader device then instructs the PKI device to digitally sign the above mentioned challenge with the user's private key stored in the user's PKI device. The reader device receives the resulting digital signature and derives a PKRIP from that digital signature e.g. it may take the first 5 bytes of the asymmetric cryptogram that is present in the digital signature and convert these 5 bytes into its decimal representation. The reader then encrypts the PKRIP by doing a modulo-10 addition of each PKRIP digit with the corresponding digit in the Activation Code that was entered by the user. The reader displays the thus encrypted PKRIP on its display and the user communicates the displayed encrypted PKRIP to the registration application (e.g. by copying the encrypted PKRIP onto a webpage of the registration application in the user's web browser). The application provider retrieves the Activation Code that was provided to that particular user and uses it to decrypt the received encrypted PKRIP using. The application provider then stores the PKRIP (e.g. in a database) linked to the user's User ID.

From now on when the user wants to access the application provider's application, the user is requested to log in by providing his/her User ID and an OTP generated by his/her reader device in conjunction with his/her PKI device. The reader device generates OTPs as follows. The reader device requests the user to insert his/her PKI device and to enter the PKI devices PIN. The reader device submits the PIN to the PKI device for verification. Then the reader device submits the above mentioned challenge to the PKI device and instructs the PKI device to digitally sign the challenge with the user's private key stored on the PKI device. The reader device receives the resulting digital signature and derives the same PKRIP from that digital signature as the PKRIP that was derived for the registration phase. The reader generates an OTP by cryptographically combining the PKRIP with a dynamic variable (such as the value of the reader device's real-time clock or a counter maintained by the reader device) and the above mentioned symmetric reader secret using a symmetric cryptographic algorithm. The reader device may for example concatenate the PKRIP and the dynamic variable and encrypt the concatenation with the AES encryption algorithm using the symmetric reader secret as the AES encryption key, after which the reader may decimalize a part (e.g. the first 3 bytes) of the resulting cryptogram and display the result as the OPT on its display for the user to communicate to the application. In one embodiment, the reader device may feed the PKRIP value to an OTP generation algorithm which takes at least two dynamic variables at least one of which is originally conceived to be an external dynamic variable (such as a challenge) and to which the reader device assigns the PKRIP values. For example the reader device may use an OTP algorithm that uses two dynamic variables: a first internal time-based dynamic variable and a second external dynamic variable that is originally conceived to be assigned a challenge value generated by the application, whereby the reader device assigns the PKRIP value to the second dynamic variable.

The authentication component of the application (the server side) verifies the received OTP as follows. Using the User ID as a search key it retrieves the PKRIP value associated with the user. It determines the value of the symmetric reader secret from the User ID. It determines the values of the dynamic variable used in the generation of the received OTP (such as a timer or counter value). It then cryptographically combines the retrieved PKRIP value and the determined value for the dynamic variable with the determined symmetric reader secret using a symmetric cryptographic algorithm that is similar to the algorithm used by the reader devices. The result of this cryptographic combining is then compared to the received OTP. The authentication component may for example concatenate the retrieved PKRIP value and the determined value for the dynamic variable and encrypt the concatenation with the AES encryption algorithm using the symmetric reader secret as the AES encryption key, after which it may decimalize a part (e.g. the first 3 bytes) of the resulting cryptogram and check whether the result is the same as the received OTP. In one embodiment the authentication component comprises two layers. A first layer is an inner layer (i.e., 1801) that is capable of verifying an OTP generated using a symmetric secret (1804), a dynamic variable (1806) and another dynamic variable (1805) that is originally conceived to be an external dynamic variable e.g. a challenge. The inner layer has an interface (i.e., 1802) that receives the OTP to be verified (i.e., 1807), the secret key and the value of the external dynamic variable (1805). The second layer (i.e., 1802) is an outer layer which is called by the application to verify the received OTP. The outer layer contains the symmetric reader secret and determines the user's PKRIP value (i.e., 1825) on the basis of the User ID (i.e., 1808) received from the calling application. To verify the OTP the outer layer calls the inner layer and passes the OTP (i.e., 1807) and the symmetric reader secret and it passes the PKRIP value (1825) as the value for the another external dynamic variable (1805). The inner layer verifies the OTP and returns the result to the outer layer which returns the result to the application.

One advantage of this embodiment is that the user can use any reader device and can even change at any moment from one reader device to another.

In another particular embodiment reader devices are being made available to a plurality of users. The reader devices may be distributed by an application provider to some of its users e.g. by mail. The reader devices may also be for sale in e.g. a supermarket or on web shop. The reader devices are adapted to interact with a PKI device e.g. a smart card that is issued by a government agency to citizens to act as electronic id card for those citizens and that contains a private key and associated certificates and that is capable of asymmetric cryptographic operations with the private key e.g. to generate a digital signatures or to decrypt data encrypted with the public key associated with the private key. All reader devices contain a certain challenge which is unique for each reader device. All reader devices also contain a symmetric reader secret which is unique for each reader device. All reader devices have furthermore a secret Activation Key that is unique for each reader device.

The application provider invites the users to register themselves. To register, a user logs in and authenticates using an existing authentication mechanism e.g. using a static password in combination with his/her User ID. The user then inserts his or her PKI device (e.g. their electronic ID card) into his or her reader device and enters his or her Activation Code on the reader device. The reader device requests the user to insert his/her PKI device and to enter the PKI devices PIN. The reader device submits the PIN to the PKI device for verification. The reader device then instructs the PKI device to digitally sign its reader device specific challenge with the user's private key stored in the user's PKI device. The reader device receives the resulting digital signature and derives a PKRIP from that digital signature e.g. it may take the first 5 bytes of the asymmetric cryptogram that is present in the digital signature and convert these 5 bytes into its decimal representation. The reader then encrypts the PKRIP by doing a modulo-10 addition of each PKRIP digit with the corresponding digit in the reader device's Activation Key. The reader displays the thus encrypted PKRIP on its display and the user communicates the displayed encrypted PKRIP to the registration application (e.g. by copying the encrypted PKRIP onto a webpage of the registration application in the user's web browser). The user also communicates the serial number of the reader device he or she is using to the application.

The application provider has a database that lists the reader device specific symmetric reader secrets and Authentication Keys linked to the serial number of the corresponding reader device. The application retrieves the Activation Key of the reader device that the user uses and uses that Activation Key to decrypt the received encrypted PKRIP using. The application provider then stores (e.g. in a database) the PKRIP and the reader device's serial number linked to the user's User ID.

From now on when the user wants to access the application provider's application, the user is requested to log in by providing his/her User ID and an OTP generated by his/her reader device in conjunction with his/her PKI device. The reader device generates OTPs as follows. The reader device requests the user to insert his/her PKI device and to enter the PKI devices PIN. The reader device submits the PIN to the PKI device for verification. Then the reader device submits its reader device specific challenge to the PKI device and instructs the PKI device to digitally sign this challenge with the user's private key stored on the PKI device. The reader device receives the resulting digital signature and derives the same PKRIP from that digital signature as the PKRIP that was derived for the registration phase. The reader generates an OTP by cryptographically combining the PKRIP with a dynamic variable (such as the value of the reader device's real-time clock or a counter maintained by the reader device) and its reader device specific symmetric reader secret using a symmetric cryptographic algorithm. The reader device may for example concatenate the PKRIP and the dynamic variable and encrypt the concatenation with the AES encryption algorithm using the reader device specific symmetric reader secret as the AES encryption key, after which the reader device may decimalize a part (e.g. the first 3 bytes) of the resulting cryptogram and display the result as the OPT on its display for the user to communicate to the application. In one embodiment, the reader device may feed the PKRIP value to an OTP generation algorithm which takes at least two dynamic variables at least one of which is originally conceived to be an external dynamic variable (such as a challenge) and to which the reader device assigns the PKRIP values. For example the reader device may use an OTP algorithm that uses two dynamic variables: a first internal time-based dynamic variable and a second external dynamic variable that is originally conceived to be assigned a challenge value generated by the application, whereby the reader device assigns the PKRIP value to the second dynamic variable.

The authentication component of the application verifies the received OTP as follows. Using the User ID as a search key it retrieves the PKRIP value and the serial number of the reader device associated with the user. Using the serial number of the user's reader device it determines the value of the reader device specific symmetric reader secret. It determines the values of the dynamic variable used in the generation of the received OTP. It then cryptographically combines the retrieved PKRIP value and the determined value for the dynamic variable with the determined symmetric reader secret using a symmetric cryptographic algorithm that is similar to the algorithm used by the reader devices. The result of this cryptographic combining is then compared to the received OTP. The authentication component may for example concatenate the retrieved PKRIP value and the determined value for the dynamic variable and encrypt the concatenation with the AES encryption algorithm using the symmetric reader secret as the AES encryption key, after which it may decimalize a part (e.g. the first 3 bytes) of the resulting cryptogram and check whether the result is the same as the received OTP. In one embodiment the authentication component comprises two layers. A first layer is an inner layer that is capable of verifying an OTP generated using a symmetric secret, a first dynamic variable and a second dynamic variable that is originally conceived to be an external dynamic variable e.g. a challenge. The inner layer has an interface that expects the OTP to be verified, the secret key and the value of the external dynamic variable. The second layer is an outer layer which is called by the application to verify the received OTP. The outer layer contains the symmetric reader secret and determines the user's PKRIP value and the reader device specific symmetric reader secret on the basis of the User ID received from the calling application as described above. To verify the OTP the outer layer calls the inner layer and passes the OTP and the symmetric reader secret and it passes the PKRIP value as the value for the second external dynamic variable. The inner layer verifies the OTP and returns the result to the outer layer which returns the result to the application.

One advantage of this embodiment is the extra security offered by the fact that to generate valid OTPs one needs not only access to the user's PKI device (and the PIN of the user's PKI device) but also the reader device that the user registered in the registration phase.

The foregoing has described several aspects or embodiments comprising methods or devices. In another aspect the invention comprises a sequence of instructions recorded on a computer readable medium which, when executed by a processor perform methods as already described. Software delivery can also be effected over digital networks such as the Internet. Accordingly in still a further aspect the invention comprehends an information bearing signal which comprises a sequence of instructions which, when executed by a processor perform methods as already described.

It should be emphasized that the term "comprises/comprising" when used in this specification is taken to specify the presence of stated features, steps, or components but does not preclude the presence or addition of one or more other features, steps, components or groups thereof.

While several embodiments of the invention have been described with some particularity it should be understood that this description is exemplary and not limiting; the scope of the invention is to be determined by the claims appended hereto.

What is claimed is:

1. A method for securing an application comprising the steps of:
registering data representing a private key for at least one user having a PKI device storing said private key; said registering comprising
receiving a representation of a Private Key Code generated by a reader device operating in conjunction with said PKI device where said generation of said Private Key Code by said reader device occurs by said reader device generating and sending a challenge to said PKI device, and instructing said PKI device to perform an asymmetric cryptographic operation on said challenge with said private key, and said reader device receiving from said PKI device a result of said asymmetric cryptographic operation, and deriving from said received result said Private Key Code;
deriving from said representation of said Private Key Code a Private Key Related Value,
storing said Private Key Related Value linked to said user;
receiving from said at least one user at least one dynamic credential that has been generated by a reader device in conjunction with said PKI device and where said generation by said reader device of said dynamic credential comprises obtaining and sending said challenge to said PKI device, instructing said PKI device to perform an asymmetric cryptographic operation on said challenge with said private key, receiving from said PKI device a result of said asymmetric cryptographic operation, deriving from said received result a first Private Key Related Input Parameter, deriving said dynamic credential by cryptographically combining said derived first Private Key Related Input Parameter with at least one dynamic input variable;
verifying the received dynamic credentials comprising the steps of:
retrieving said stored Private Key Related Value linked to said user, and
deriving from said retrieved Private Key Related Value a second Private Key Related Input Parameter,
calculating a reference value by cryptographically combining said derived second Private Key Related Input Parameter with a value for at least one dynamic input variable, and
comparing said calculated reference value with said received dynamic credential; and
protecting access to said application in dependence on the outcome of said verifying.

2. The method of claim 1 wherein said representation of said Private Key Code comprises said Private Key Code encrypted with a symmetric Activation Key secret by said reader; and
deriving said Private Key Related Value from said representation of said Private Key Code comprises decrypting said encrypted Private Key Code.

3. The method of claim 2 further comprising providing the user with an Activation Code and wherein said Activation Key secret is derived by said reader device from said Activation Code.

4. The method of claim 3 further comprising providing the user with said reader device.

5. The method of claim 1 further comprising the steps of:
receiving from a user a claimed identity;
receiving a User Identity Code;
determining using the received claimed identity a User Identity Reference Code; and
comparing said User Identity Reference Code with said received User Identity Code.

6. A reader device for generating dynamic credentials comprising:
a communication interface to communicate with a PKI device that stores at least one private key and that is capable of performing asymmetric cryptographic operations with said private key, said communication interface adapted to exchange data and commands with said PKI device;
processing components adapted to:
generate a challenge,
send said challenge to said PKI device,
instruct said PKI device to perform an asymmetric cryptographic operation on said challenge,
receive from said PKI device a result of said asymmetric cryptographic operation;
derive a Private Key Code from said received result;
derive a Private Key Related Input Parameter from said received result; and
generate dynamic credentials by cryptographically combining said Private Key Related Input Parameter with at least one dynamic variable using a symmetric cryptographic algorithm;
said reader device further comprising output components adapted to output data related to said Private Key Code and said generated dynamic credentials.

7. The reader device of claim 6 wherein said processing components are further adapted to encrypt said Private Key Code with an Activation Key secret using a symmetric encryption algorithm.

8. The reader of claim 7 further comprising input components adapted to receive an Activation Code; and wherein said processing means are further adapted to derive said Activation Key secret from said Activation Code.

9. The reader device of claim 6 further comprising a memory for storing one or more symmetric secret keys; and wherein said processing means are further adapted to generate dynamic credentials by cryptographically combining said Private Key Related Input Parameter and at least one dynamic variable with at least one of said one or more symmetric secret keys using a symmetric cryptographic algorithm.

10. The reader device of claim 9 wherein at least one of said one or more symmetric secret keys is shared among a plurality of reader devices.

11. The reader device of claim 9 wherein at least one of said one or more symmetric secret keys is specific for each one of a plurality of reader devices.

12. The reader device of claim 6 wherein said PKI device comprises a smart card and wherein said communication means comprises a smart card interface.

13. The reader device of claim 6 wherein said asymmetric cryptographic operation by said PKI device with said private key comprises digitally signing said challenge with said private key and wherein said received result of said asymmetric cryptographic operation comprises a digital signature.

14. The reader device of claim 6 further adapted to: read from said PKI device an identity related data element that is related to the identity of the legitimate holder of the PKI device; and derive from said identity related data element a User Identity Code.

15. The reader device of claim 14 wherein said output components are further adapted to output said User Identity Code.

16. The reader device of claim 14 wherein said processing components are further adapted to generate dynamic credentials by cryptographically combining said Private Key Related Input Parameter and said User Identity Code with at least one dynamic variable using a symmetric cryptographic algorithm.

* * * * *